US012629894B2

(12) United States Patent (10) Patent No.: US 12,629,894 B2
Jones et al. (45) Date of Patent: May 19, 2026

(54) APPARATUS AND METHOD FOR PERFORMING IN-PROCESS TESTING FOR VERIFICATION OF PRINT PARAMETERS IN A 3D PRINTING APPARATUS

(71) Applicant: Markforged, Inc, Watertown, MA (US)

(72) Inventors: Bruce David Jones, Sudbury, MA (US); Edward William Klacza, Cambridge, MA (US); David Steven Benhaim, Miami, FL (US); Arthur Edward Plummer, Quincy, MA (US)

(73) Assignee: MARKFORGED, INC, Waltham, MA (US)

( * ) Notice: Subject to any disclaimer, the term of this patent is extended or adjusted under 35 U.S.C. 154(b) by 532 days.

(21) Appl. No.: 18/156,487

(22) Filed: Jan. 19, 2023

(65) Prior Publication Data

US 2023/0226771 A1 Jul. 20, 2023

Related U.S. Application Data

(60) Provisional application No. 63/300,679, filed on Jan. 19, 2022.

(51) Int. Cl.
*B33Y 50/02* (2015.01)
*B29C 64/393* (2017.01)
*B33Y 40/00* (2020.01)

(52) U.S. Cl.
CPC ............. *B29C 64/393* (2017.08); *B33Y 40/00* (2014.12); *B33Y 50/02* (2014.12)

(58) Field of Classification Search
CPC ... B29C 64/393; B29C 64/194; B29C 64/386; B29C 64/118; B33Y 40/00; B33Y 50/02; B33Y 10/00; B33Y 50/00; B22F 10/31; B22F 10/85; B22F 12/90; G05B 19/4099; G05B 19/41875; Y02P 90/02; G06F 21/608
See application file for complete search history.

(56) References Cited

U.S. PATENT DOCUMENTS

| | | | | |
|---|---|---|---|---|
| 5,303,141 A | * | 4/1994 | Batchelder | B33Y 70/10 |
| | | | | 156/244.11 |
| 10,268,182 B2 | * | 4/2019 | Salem | G06F 21/608 |

(Continued)

FOREIGN PATENT DOCUMENTS

| | | | | | |
|---|---|---|---|---|---|
| CA | 2919508 C | * | 1/2020 | | B29C 48/02 |
| CN | 108312547 B | * | 12/2019 | | B33Y 10/00 |

(Continued)

OTHER PUBLICATIONS

Extended European Search Report dated May 17, 2023, in European Patent Application No. 23152547.8.

*Primary Examiner* — Yongjia Pan
(74) *Attorney, Agent, or Firm* — PEARL COHEN ZEDEK LATZER BARATZ LLP

(57) ABSTRACT

A 3D printing apparatus and method confirms that one or more print parameters was satisfied in the printing of a 3D object. Sensor readings are obtained during the printing of the 3D object. Based on sensor data corresponding to the sensor readings, a confirmation is made as to whether the one or more print parameters was satisfied in the printing of the 3D object.

14 Claims, 13 Drawing Sheets

(56)                    References Cited

U.S. PATENT DOCUMENTS

| | | | | |
|---|---|---|---|---|
| 2015/0061170 A1* | 3/2015 | Engel | B33Y 10/00 | |
| | | | 425/135 | |
| 2015/0174828 A1* | 6/2015 | Creuzer | G01B 11/005 | |
| | | | 425/150 | |
| 2015/0266242 A1 | 9/2015 | Comb et al. | | |
| 2016/0098824 A1* | 4/2016 | Fry | G06F 18/22 | |
| | | | 700/108 | |
| 2016/0184893 A1* | 6/2016 | Dave | B22F 12/90 | |
| | | | 419/53 | |
| 2016/0236414 A1* | 8/2016 | Reese | B33Y 50/02 | |
| 2018/0079125 A1* | 3/2018 | Perez | B29C 48/266 | |
| 2018/0178451 A1* | 6/2018 | Gosch | B33Y 30/00 | |
| 2018/0264590 A1* | 9/2018 | Goldfine | G01K 13/10 | |
| 2019/0054700 A1* | 2/2019 | Chandar | G06F 17/18 | |
| 2019/0299536 A1 | 10/2019 | Putman et al. | | |
| 2019/0381736 A1* | 12/2019 | Jensen | G01B 11/2518 | |
| 2020/0030879 A1* | 1/2020 | Liang | B29D 11/00038 | |
| 2020/0031055 A1* | 1/2020 | Schumann | B33Y 50/02 | |
| 2020/0143006 A1 | 5/2020 | Matusik et al. | | |
| 2020/0230884 A1* | 7/2020 | Buggenthin | B29C 64/386 | |
| 2020/0247063 A1* | 8/2020 | Pinskiy | G06F 18/2411 | |
| 2020/0361155 A1* | 11/2020 | Jones | B29C 64/393 | |
| 2021/0294552 A1* | 9/2021 | Fujita | G06F 3/1258 | |
| 2022/0080508 A1* | 3/2022 | Champion | B22F 12/30 | |
| 2023/0076556 A1* | 3/2023 | Goyal | B29C 64/188 | |

FOREIGN PATENT DOCUMENTS

| | | | | | |
|---|---|---|---|---|---|
| CN | 108481749 B | * | 9/2020 | | B29C 64/364 |
| WO | WO-2017139332 A1 | * | 8/2017 | | B29C 48/92 |

* cited by examiner

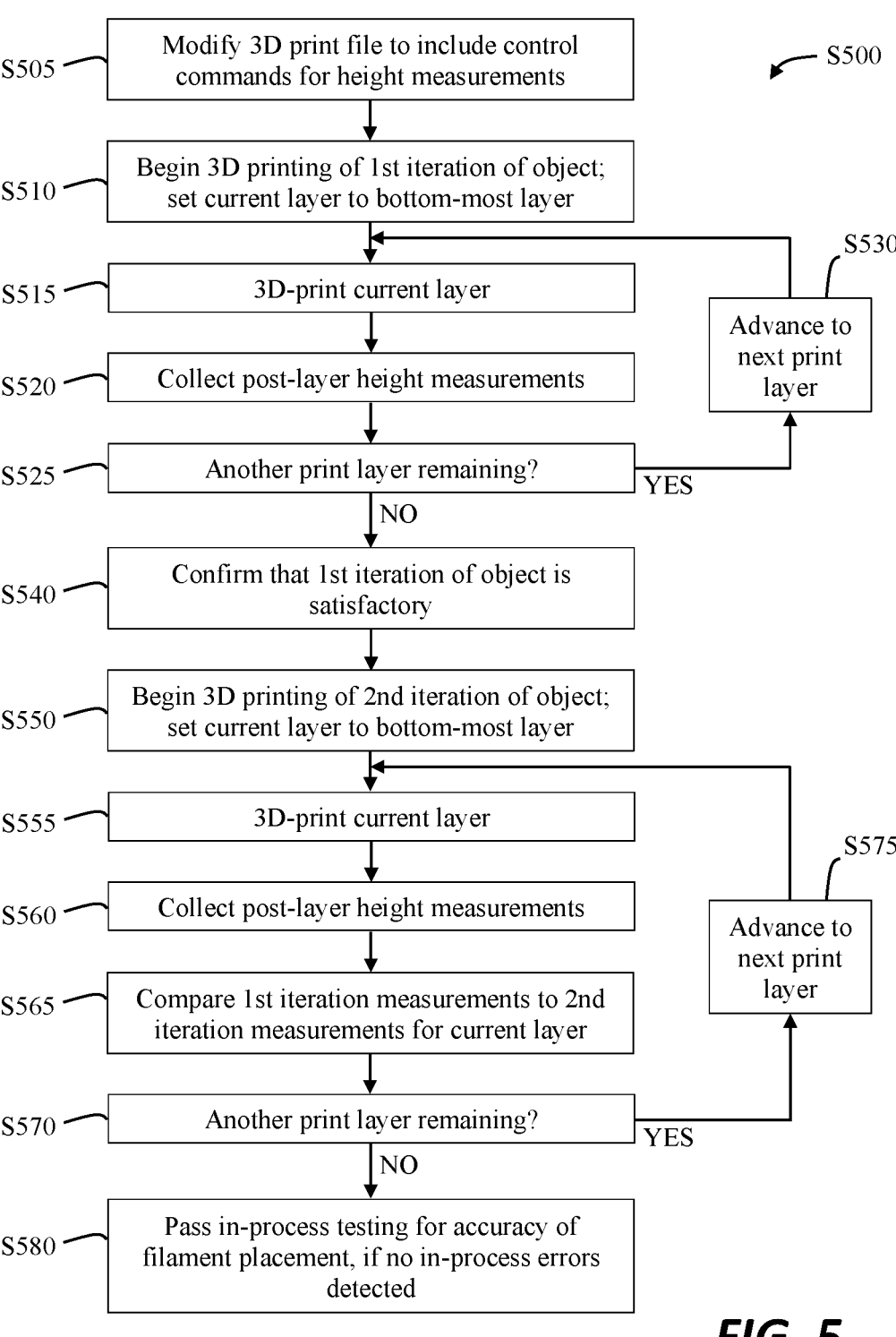

S505 — Modify 3D print file to include control commands for height measurements

S500

S510 — Begin 3D printing of 1st iteration of object; set current layer to bottom-most layer S515 — 3D-print current layer S520 — Collect post-layer height measurements S525 — Another print layer remaining?

S530 — Advance to next print layer

YES

NO

S540 — Confirm that 1st iteration of object is satisfactory

S550 — Begin 3D printing of 2nd iteration of object; set current layer to bottom-most layer S555 — 3D-print current layer S560 — Collect post-layer height measurements S565 — Compare 1st iteration measurements to 2nd iteration measurements for current layer S570 — Another print layer remaining?

S575 — Advance to next print layer

YES

NO

S580 — Pass in-process testing for accuracy of filament placement, if no in-process errors detected

FIG. 5

APPARATUS AND METHOD FOR PERFORMING IN-PROCESS TESTING FOR VERIFICATION OF PRINT PARAMETERS IN A 3D PRINTING APPARATUS

This application claims priority to U.S. Provisional Application No. 63/300,679, filed Jan. 19, 2022, which is incorporated by reference herein in its entirety.

FIELD OF THE INVENTION

The invention relates to an apparatus and method for performing in-process testing for verification of print parameters in a 3D printing apparatus.

BACKGROUND OF THE INVENTION

In a 3D printing system, post-production analysis may be applied to a 3D printed object. For instance, destructive testing or X-ray examination may be conducted on the object.

However, these approaches are not sufficient to fully validate a correct printing operation. Therefore, a need exists for efficiently performing in-process non-destructive testing in 3D printing.

SUMMARY OF THE INVENTION

One aspect of the present invention relates to an apparatus comprising at least one processor; and at least one memory, wherein the at least one memory stores computer-readable instructions which, when executed by the at least one processor, cause the processor to: control a printer component to print a 3D object, based on print instructions that include a plurality of print parameters; receive sensor data corresponding to a sensor reading obtained during the printing of the 3D object; and confirm, based on the received sensor data, that at least one of the print parameters was satisfied in the printing of the 3D object.

Another aspect of the present invention relates to a method comprising controlling a printer component to print a 3D object, based on print instructions that include a plurality of print parameters; receiving sensor data corresponding to a sensor reading obtained during the printing of the 3D object; and confirming, based on the sensor data, that at least one of the print parameters was satisfied in the printing of the 3D object.

These and other aspects of the invention will become apparent from the following disclosure.

BRIEF DESCRIPTION OF THE DRAWINGS

FIG. 5 is a flow chart for verifying accuracy of fiber placement, in accordance with one embodiment.

DETAILED DESCRIPTION OF THE PREFERRED EMBODIMENTS

Figure 1A:
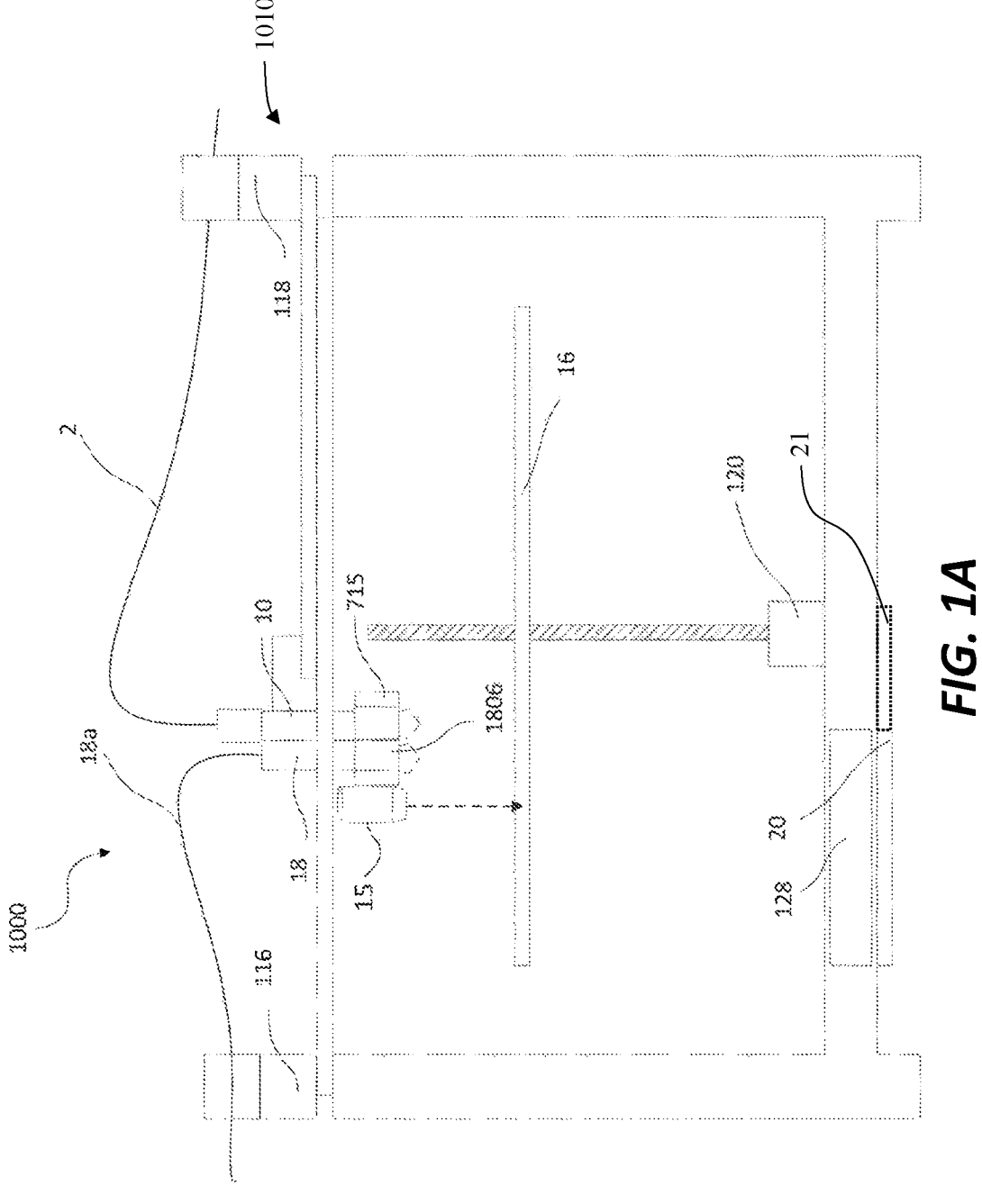
FIGS. 1A and 1B illustrate an apparatus, in accordance with one embodiment.

The inventors of the present invention recognized a need in the art for in-process testing during 3D printing operation (e.g., for validation purposes). A user of a 3D printer may desire to know exactly what is happening with every portion of every layer of every part and insist on traceability. A user of a 3D printer may desire to know if and where material was placed and with confidence confirm the content of that material.

Testing and analysis may be used to evaluate the properties of a material, component, structure, or system. Testing may be used to confirm fidelity of with design, fidelity with prior iterations, physical properties or characteristics with design, physical properties or characteristics in comparison with other components, and/or analysis, assessment or evaluation of defects, differences, and discontinuities. For instance, testing may validate that a selected print/process parameter is in fact successfully implemented in the printed object. In this regard, almost any print slicing setting may be subject to validation. In addition, the inventors recognized that various print/process parameters affect the part internally (e.g., a user-selected infill density) and cannot be confirmed by visual inspection once the part is complete.

The inventors recognized the superiority of in-process testing over post-print testing. In general, two general categories of post-print testing exist: (1) destructive testing and (2) non-destructive testing. In destructive testing, a 3D object (or a part thereof) is printed and sacrificed for the sole purpose of testing. The object (or part) is altered by the testing process (e.g., broken apart), such that it is no longer useful as a final printed product. Destructive testing suffers from various disadvantages, including:

- cost (e.g., cost of material, component, structure, or system sacrificed to the destruction process),
- time (e.g., time in making and destroying the object via the process to obtain the information, time in completing the required analysis for evaluation (e.g., layer-by-layer sectioning of parts), cost for FMEA equipment (capital), etc.)

Non-destructive testing incorporates testing methodologies (e.g., X-ray scans) that do not alter the printed part, thereby allowing the printed object to serve as a final product. Non-destructive testing likewise has various disadvantages, including:

- cost (e.g., cost of additional hardware such as sensitive non-contact sensor equipment, an additional process, or human intervention),
- time (e.g., time in making and destroying the object via the process to obtain the information, time in completing the required analysis for evaluation (e.g., layer-by-layer sectioning of parts), cost for FMEA equipment (capital), etc.)

precision (testing may not be as accurate or precise as destructive testing, especially if testing is only performed after completion of printing).

The inventors recognized that existing in-process approaches do not provide sufficient testing for validation purposes, and are generally limited to detecting clogged nozzles or measuring a final external profile of an object.

As such, the inventors invented an approach to efficiently perform non-destructive testing of a 3D part being printed, during the printing operation (e.g., in-process).

3D Printer Apparatus

Figure 1B:
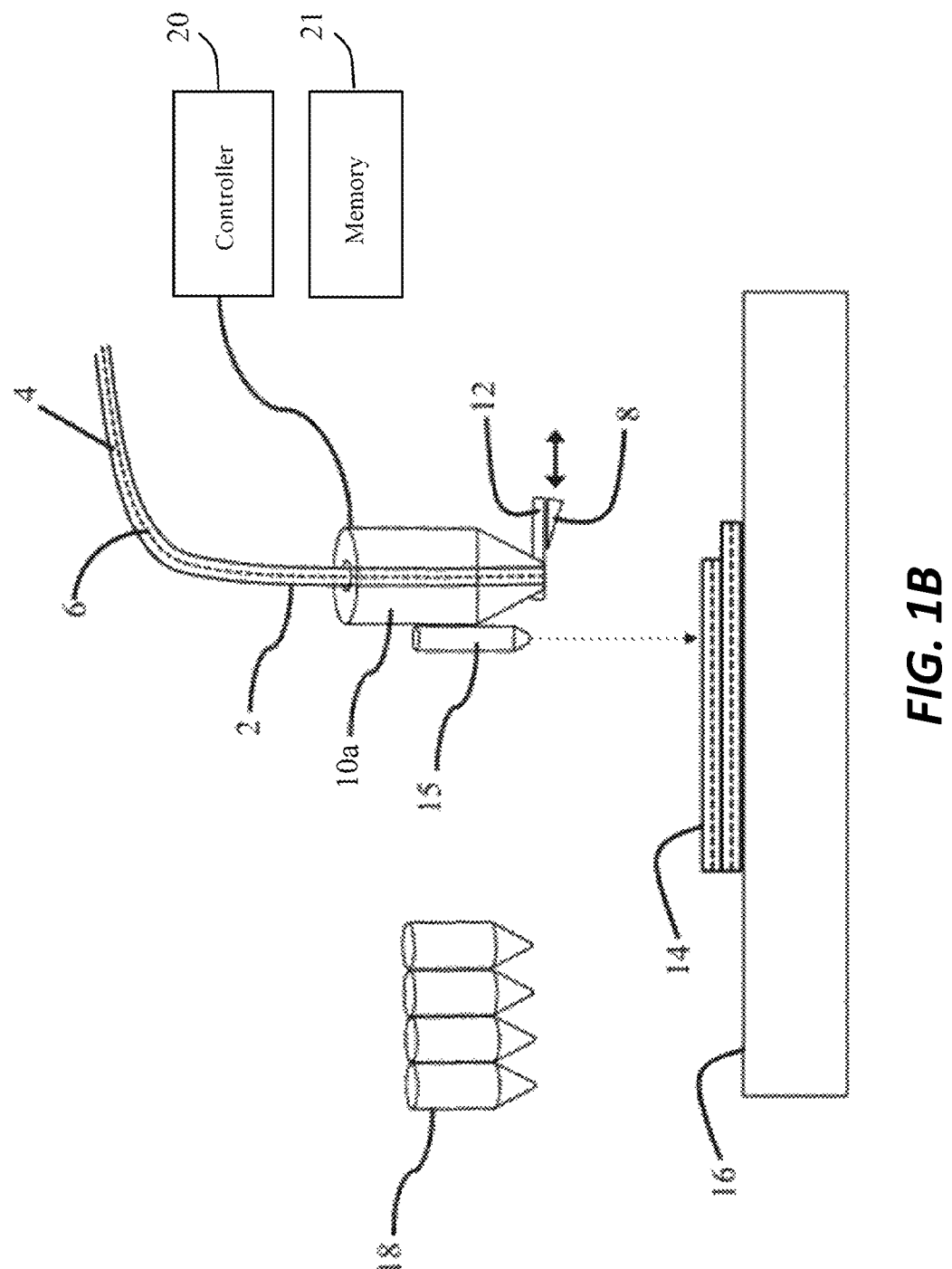

FIGS. 1A-1B illustrate an apparatus 1000 in accordance with one embodiment of the invention. The apparatus 1000 includes one or more controllers 20, one or more memories 21, and one or more print heads 10, 18. For instance, one head 10 may deposit a metal or fiber reinforced composite filament 2, and another head 18 may apply pure or neat matrix resin 18*a* (thermoplastic or curing), which may include, but is not limited to, a polymer or curable monomer and/or a polymer or curable monomer filled, e.g., with chopped carbon fiber, carbon black, silica, and/or aramid fiber. In the case of the filament 2 being a fiber reinforced composite filament, such filament (also referred to herein as continuous core reinforced filament) may be substantially void free and include a polymer or resin that coats, permeates or impregnates an internal continuous core (including, but not limited to, single, multi-strand, or multi-material). It should be noted that although the print head 18 is shown as an extrusion print head, "fill material print head" 18 as used herein includes optical or UV curing, heat fusion or sintering, or "polyjet", liquid, colloid, suspension or powder jetting devices (not shown) for depositing fill material. It will also be appreciated that a material bead formed by the filament 10*a* may be deposited as extruded thermoplastic or metal, deposited as continuous or semi-continuous fiber, solidified as photo or UV cured resin, or jetted as metal or binders mixed with plastics or metal, or are structural, functional or coatings. The fiber reinforced composite filament 2 (also referred to herein as continuous core reinforced filament) may be a push-pulpreg that is substantially void free and includes a polymer or resin 4 that coats or impregnates an internal continuous single core or multistrand core 6. The apparatus includes heaters 715, 1806 to heat the print heads 10, 18, respectively so as to facilitate deposition of layers of material to form the object 14 to be printed. A cutter 8 controlled by the controller 20 may cut the filament 2 during the deposition process in order to (i) form separate features and components on the structure as well as (ii) control the directionality or anisotropy of the deposited material and/or bonded ranks in multiple sections and layers. As depicted, the cutter 8 is a cutting blade associated with a backing plate 12 located at the nozzlet outlet. Other cutters include laser, high-pressure air or fluid, or shears. The apparatus 1000 may also include additional non-printing tool heads, such as for milling, SLS, etc.

The apparatus 1000 includes a gantry 1010 that supports the print heads 10, 18. The gantry 1010 includes motors 116, 118 to move the print heads 10, 18 along X and Y rails in the X and Y directions, respectively. The apparatus 1000 also includes a build platen 16 (e.g., print bed) on which an object to be printed is formed. The height of the build platen 16 is controlled by a motor 120 for Z direction adjustment. Although the movement of the apparatus has been described based on a Cartesian arrangement for relatively moving the print heads in three orthogonal translation directions, other arrangements are considered within the scope of, and expressly described by, a drive system or drive or motorized drive that may relatively move a print head and a build plate supporting a 3D printed object in at least three degrees of freedom (i.e., in four or more degrees of freedom as well). For example, for three degrees of freedom, a delta, parallel robot structure may use three parallelogram arms connected to universal joints at the base, optionally to maintain an orientation of the print head (e.g., three motorized degrees of freedom among the print head and build plate) or to change the orientation of the print head (e.g., four or higher degrees of freedom among the print head and build plate). As another example, the print head may be mounted on a robotic arm having three, four, five, six, or higher degrees of freedom; and/or the build platform may rotate, translate in three dimensions, or be spun.

FIG. 1B depicts an embodiment of the apparatus 1000 applying the filament 2 to build a structure. In one embodiment, the filament 2 is a metal filament for printing a metal object. In one embodiment, the filament 2 is a fiber reinforced composite filament (also referred to herein as continuous core reinforced filament) may be a push-pulpreg that is substantially void free and includes a polymer or resin 4 that coats or impregnates an internal continuous single core or multistrand core 6.

The filament 2 is fed through a nozzlet 10*a* disposed at the end of the print head 10, and heated to extrude the filament material for printing. In the case that the filament 2 is a fiber reinforced composite filament, the filament 2 is heated to a controlled push-pultrusion temperature selected for the matrix material to maintain a predetermined viscosity, and/or a predetermined amount force of adhesion of bonded ranks, and/or a surface finish. The push-pultrusion may be greater than the melting temperature of the polymer 4, less than a decomposition temperature of the polymer 4 and less than either the melting or decomposition temperature of the core 6.

After being heated in the nozzlet 10*a* and having its material substantially melted, the filament 2 is applied onto the build platen 16 to build successive layers 14 to form a three dimensional structure. One or both of (i) the position and orientation of the build platen 16 or (ii) the position and orientation of the nozzlet 10 are controlled by a controller 20 to deposit the filament 2 in the desired location and direction. Position and orientation control mechanisms include gantry systems, robotic arms, and/or H frames, any of these equipped with position and/or displacement sensors to the controller 20 to monitor the relative position or velocity of nozzlet 10*a* relative to the build platen 16 and/or the layers 14 of the object being constructed. The controller 20 may use sensed X, Y, and/or Z positions and/or displacement or velocity vectors to control subsequent movements of the nozzlet 10*a* or platen 16. The apparatus 1000 may optionally include a laser scanner 15 to measure distance to the platen 16 or the layer 14, displacement transducers in any of three translation and/or three rotation axes, distance integrators, and/or accelerometers detecting a position or movement of the nozzlet 10*a* to the build platen 16. The laser scanner 15 may scan the section ahead of the nozzlet 10*a* in order to correct the Z height of the nozzlet 10*a*, or the fill volume required, to match a desired deposition profile. This measurement may also be used to fill in voids detected in the object. The laser scanner 15 may also measure the object after the filament is applied to confirm the depth and position of the deposited bonded ranks. Distance from a lip of the deposition head to the previous layer or build platen, or the height of a bonded rank may be confirmed using an appropriate sensor.

Various 3D-printing aspects of the apparatus 1000 are described in detail in U.S. Patent Application Publication No. 2019/0009472, which is incorporated by reference herein in its entirety.

Sensor Set

Figure 2:
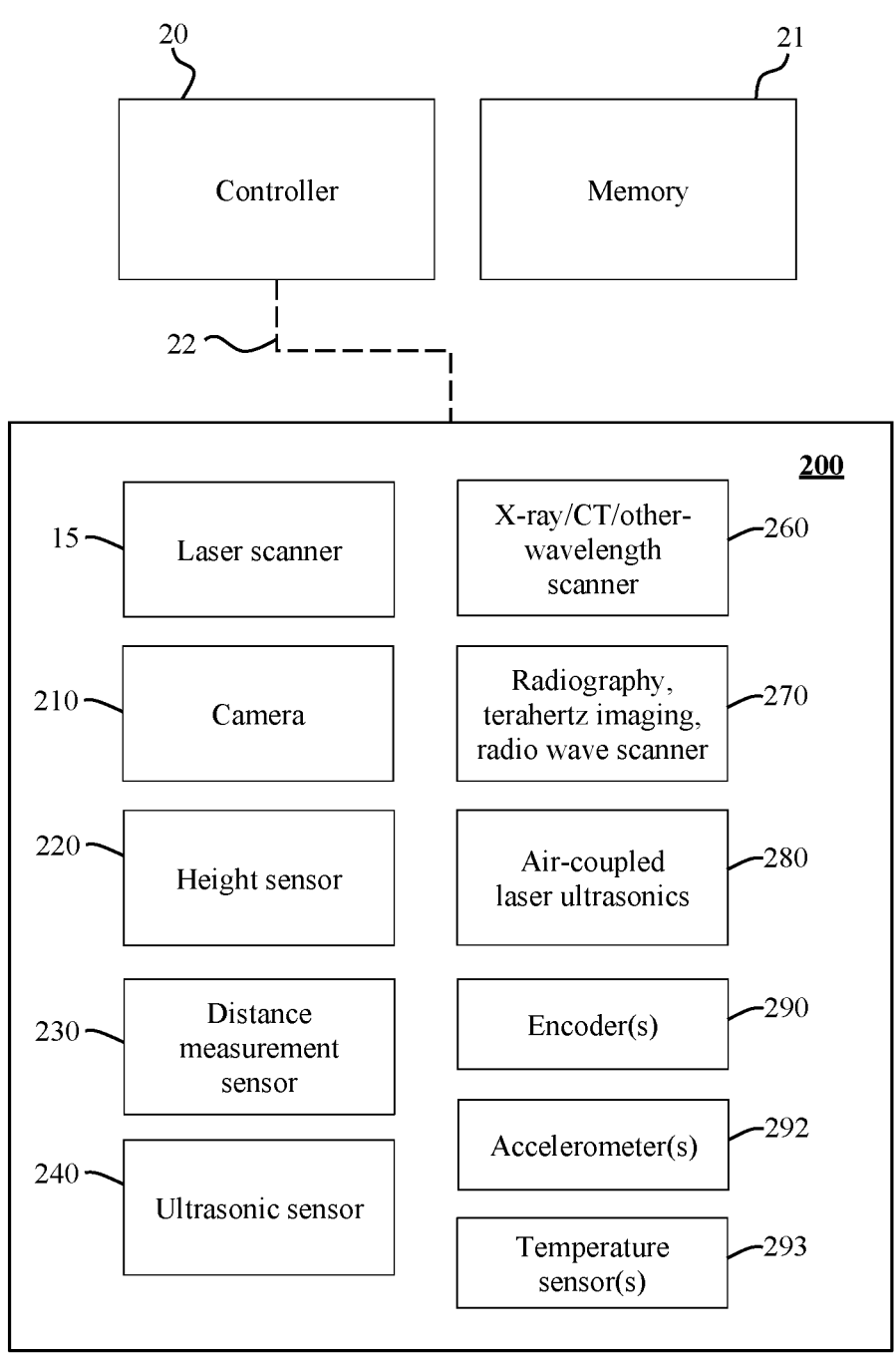
FIG. 2 is a block diagram illustrating a sensor set of the apparatus, in accordance with one embodiment.

FIG. 2 illustrates a sensor set 200 provided with the apparatus 1000, in accordance with one embodiment of the invention. The sensor set 200 may be integrated (e.g., provided on-board) with the apparatus 1000.

The sensor set 200 may include sensors (i) for measuring the 3D object being printed (both internal and external part geometries) and (ii) for monitoring performance of components of the apparatus 1000. Some of the sensors within the sensor set 200 may be used for the first purpose, other sensors within the sensor set 200 may be used for the second purpose, and yet other sensors within the sensor set 2000 may be dual-purpose and used for both purposes.

The sensor set 200 may include the laser scanner 15. The laser scanner 15 may be used to measure distance/depth of the build platen 16 and/or 3D object being printed. The laser scanner 15 may also be used to measure width and/or thickness of a filament bead, and/or to measure the placement accuracy of the filament bead. The laser scanner 15 may further be used to calibrate a motion component of the apparatus, calibrate a distance between printer nozzles, and measure an external shape or profile of a printed 3D object. Further aspects of the laser scanner 15 are described below.

The sensor set 200 may include a camera 210. The camera 210 may include a CMOS or CCD image sensor, and may be formed as a high resolution RGBD camera. The camera 210 may be used to perform photogrammetry, structured light, feature detection, height measurement, and visual verification of accurate and correct fiber placement.

The sensor set 200 may include a height sensor 220. The height sensor 220 may be formed as a contact-based sensor, such as a touch-off sensor using an existing component (e.g., extrusion nozzle) or a dedicated component (e.g., contact probe). Further aspects of the height sensor 220 are described below.

The sensor set 200 may include a distance measurement component 230. The distance measurement component 230 may incorporate any distance measuring method (interferometer, time of flight, etc.) to measure distance.

The sensor set 200 may include an ultrasonic sensor 240. The ultrasonic sensor 240 may transmit and detect ultrasonic waves and detect distance, profile, and/or other physical properties via ultrasonic detection.

The sensor set 200 may include an X-ray, computerized tomography (CT), and/or other-wavelength scanner 260. The emissions of the scanner 260 may penetrate the outer layer of the 3D object being printed, allowing the interior of the 3D object to be measured and analyzed.

The sensor set 200 may include a radiography, terahertz imaging, and/or radio wave scanner 270. For instance, the scanner 270 may include a radio detection and ranging (RADAR) system, for distance measurement by determining the elapsed time between an emitted frequency pulse and a detected reflection of such pulse.

The sensor set 200 may include an ultrasonic sensor 280. For instance, the sensor 280 may emit an ultrasonic pulse and detect its echo reflection off a surface, to determine distance, profile, and/or other physical properties. In one embodiment, the sensor 280 is an air-coupled laser ultrasonic sensor, where a laser ultrasonic pulse is emitted towards a surface to create an acoustic pressure pulse thereon, and a laser interferometer detects the displacements on the surface.

The sensor set 200 may include one or more encoders 290. Each encoder 290 may be linear-based (to detect linear distance in a linear direction) or rotary-based (to detect rotational distance in a rotational direction). The encoders 290 may ensure positional accuracy of movement components of the apparatus.

The sensor set 200 may include one or more accelerometers 292. The accelerometers 292 may detect an amount of movement of the apparatus, and may provide monitoring of the component health of these components.

The sensor set 200 may include one or more temperature sensors 294. The temperature sensors 294 may be mounted proximate to various components of the apparatus, and may provide monitoring of the component health of these components. The temperature sensors 294 may also provide confirmation that a printing operation is performed under acceptable temperature conditions.

Laser Scanner

Various aspects of the laser scanner 15 will now be discussed.

Figure 1C:
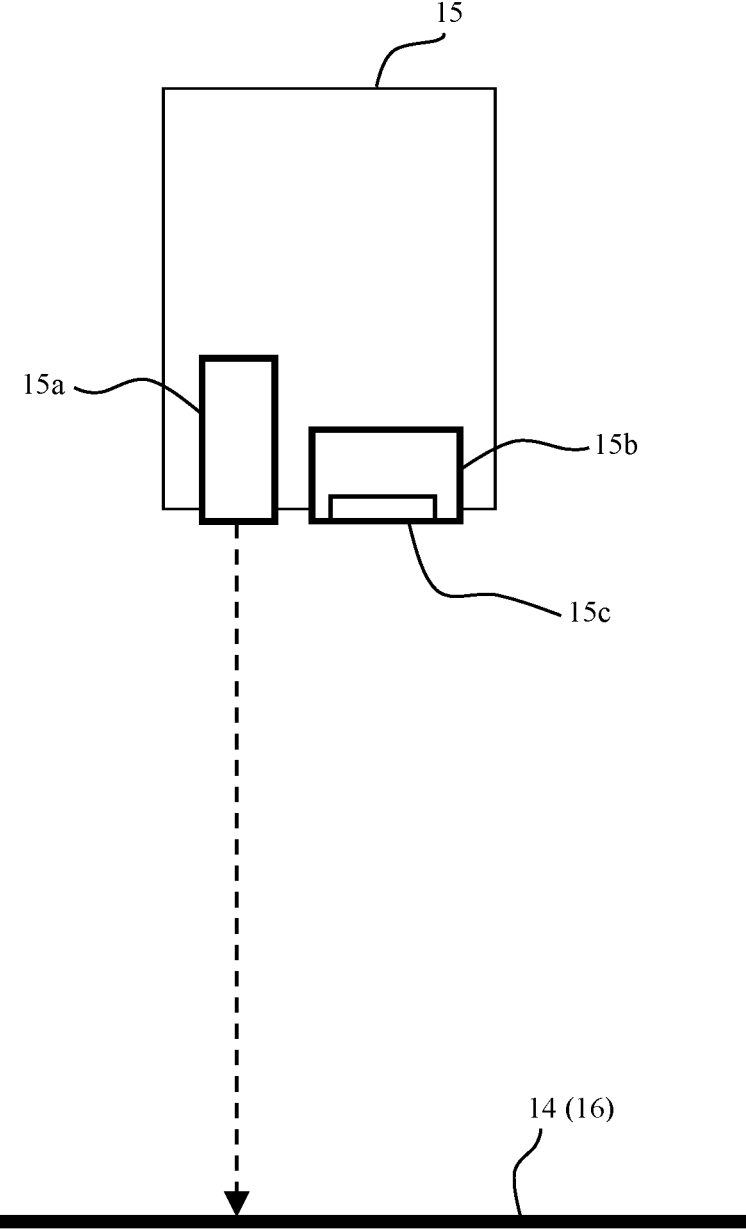
FIG. 1C illustrates a laser scanner of the apparatus, in accordance with one embodiment.

The laser scanner 15 may be formed as a short-range laser scanner, a triangulating, a phase difference, a structured light camera or sensor, or the like. As illustrated in FIG. 1C, the laser scanner 15 includes a laser emitter 15a and a laser receiver 15b.

In one embodiment, the laser scanner 15 is mounted on (e.g., integral with) the print head 10. In another embodiment, the laser scanner 15 is mounted on an independent head coupled to the print head 10. In yet another embodiment, the laser scanner 15 is fixed to the apparatus 1000 (e.g., mounted to a chassis), and the object to be measured is moved relative to the laser scanner 15.

The laser emitter 15a emits a laser beam of a predetermined sized profile on the surface of the object to be scanned. In one embodiment, the laser emitter 15a is arranged such that the emitted laser beam is oriented generally downward at a predetermined angle relative to a vertical direction of the apparatus. In one embodiment, the predetermined angle is oblique. In one embodiment, the predetermined angle is in a range between 0 and 89 degrees relative to the vertical direction, preferably between 0 and 45 degrees, and even more preferably between 0 and 20 degrees.

In one embodiment, the predetermined angle of the emitted laser beam is zero, such that the laser beam is coincident with the vertical direction and oriented directly downward. In one embodiment, the laser beam is a circular (e.g., dot) profile. In one embodiment, the diameter of the laser dot is between 0.1 and 100 μm, preferably between 20 and 80 μm, and even more preferably between 40 and 60 μm. In one embodiment, the laser beam has a profile other than a circular profile, such as a line profile or a chevron profile.

The laser receiver 15b senses the laser beam emitted from the laser emitter 15a, incident and visible on a surface of the 3D-printed object. In one embodiment, the laser receiver includes an optical sensor 15c and an optical system (not shown). In one embodiment, the optical sensor 15c is a two-dimensional sensor, including but not limited to a CCD or CMOS sensor. In another embodiment, the optical sensor 15c is a line sensor. In one embodiment, the laser scanner 15 includes a vision system to analyze optical signals received from the optical sensor 15c.

The optical sensor 15c is arranged so as to face generally downward, at a predetermined angle relative to the vertical direction of the apparatus. In one embodiment, the predetermined angle is oblique. In one embodiment, the predetermined angle is in a range between 0 and 89 degrees relative to the vertical direction, preferably between 0 and 45 degrees, and even more preferably between 0 and 20 degrees. In one embodiment, the predetermined angle is zero, such that the optical detector is facing directly downward in the vertical direction.

In one embodiment, the laser beam emitted from the laser emitter 15a is aimed directly downwards, and the optical sensor 15c is likewise aimed directly downwards. In one embodiment, the laser beam emitted from the laser emitter 15a is aimed directly downwards, while the optical sensor 15c is oriented at an angle relative to the vertical direction, preferably in a range between 0 and 45 degrees relative to the vertical direction, even more preferably between 0 and 20 degrees, and even further more preferably between 0 and 5 degrees. In one embodiment, the laser emitter 15a and the laser receiver 15b are arranged to be as close to each other as possible.

The apparatus may rely on principles of triangulation to determine the distance (e.g., depth) between the laser scanner 15 and the surface of the object on which the laser beam is incident. In particular, the distance will affect the position of the laser beam as observed from the laser receiver's perspective. The distance may be determined based on where the laser beam is observed within the laser receiver's perspective.

It will be appreciated that laser scanning involves a line of sight between the laser emitter 15a and the sample point being scanned (so that the laser beam is incident on the sample point) and a line of sight between the optical sensor 15c and the sample point (so that the visualized laser beam incidence on the object is visible to the optical sensor).

Height Sensor

In one embodiment, a contact-based height sensor 220, such as a touch probe, is employed instead of (or in addition to) the laser scanner 15 to perform depth/distance measurements.

In one embodiment, the print nozzle is used instead of (or in addition to) the laser scanner 15 to perform a contact-sensing operation to perform depth/distance measurements. In particular, the apparatus 1000 is equipped with detection capabilities for detecting when the nozzle 10 (and/or nozzle 18) contacts the build platen 16, a print layer, and/or a print material bead. By moving the nozzle 10 along the X, Y, and/or Z directions and detecting when contact occurs between the nozzle 10 and the print layer, the apparatus 1000 may take measurements of sample points on the print layer. For example, the nozzle 10 may be moved to the X-Y position of the sample point and lowered until contact is detected, and the Z-position at the time of contact is used to determine the measurement.

Ideally, using one or more sensors within the on-board sensor suite 200, every printer process parameter and printer status condition is independently verifiable. Independently-verifiable parameters include, but are not limited to:

Fiber placement

Infill density

Infill pattern (e.g., shell thickness)

Occluded features (e.g., a conformal cooling channel's position/shape/etc.)

Insert placement accuracy (e.g., any foreign body inserted, for example, by an operator, into the print object during printing), such as fasteners, reinforcements, magnets, weights, threaded heat set inserts, nuts, bolts, etc.

Correctness of print material (e.g., correct print material is loaded into the apparatus)

Override region (e.g., confirming a schedule override of a standard print feature occurred, i.e., checking any of the above quantities as they pertain specifically to a local modifier region and confirming that the modification was correctly applied)

Ideally, any process setting/parameter may be verifiable through measurements performed during printing.

Verifiable printer status conditions (e.g., mechanical and functional measures) include, but are not limited to:

Maintenance state verification (e.g., monitoring current mechanical state of the apparatus by monitoring extrusion quality, and alerting a user for maintenance if appropriate)

Printer state verification (e.g., using sensor data to confirm that the apparatus is in an optimal printing state while printing)

Safety state verification (e.g., a safety visor is down)

Sensor data/measurements may be collected during a printing operation (i.e., in-process), and software algorithms and machine learning may be used to determine whether or not the part is being printed successfully. In one embodiment, instructions to collect sensor data are injected/added into an existing 3D print file containing printer commands.

In general, sensor readings fall into one of the following categories:

"pre-print sensor readings," i.e., sensor readings performed prior to start of printing "pre-layer sensor readings," i.e., sensor readings performed prior to printing each layer (or selected layers)

"deposition-contemporaneous sensor readings," i.e., sensor readings performed concurrently with the printing of the layer "post-layer sensor readings," i.e., sensor readings performed after printing each layer (or selected layers)

"post-print sensor readings"-Sensor readings performed after completion of printing Some in-process testing may involve sensor readings taken from multiple of these categories.

Print Operation with Comprehensive Testing Protocol

Figure 3:
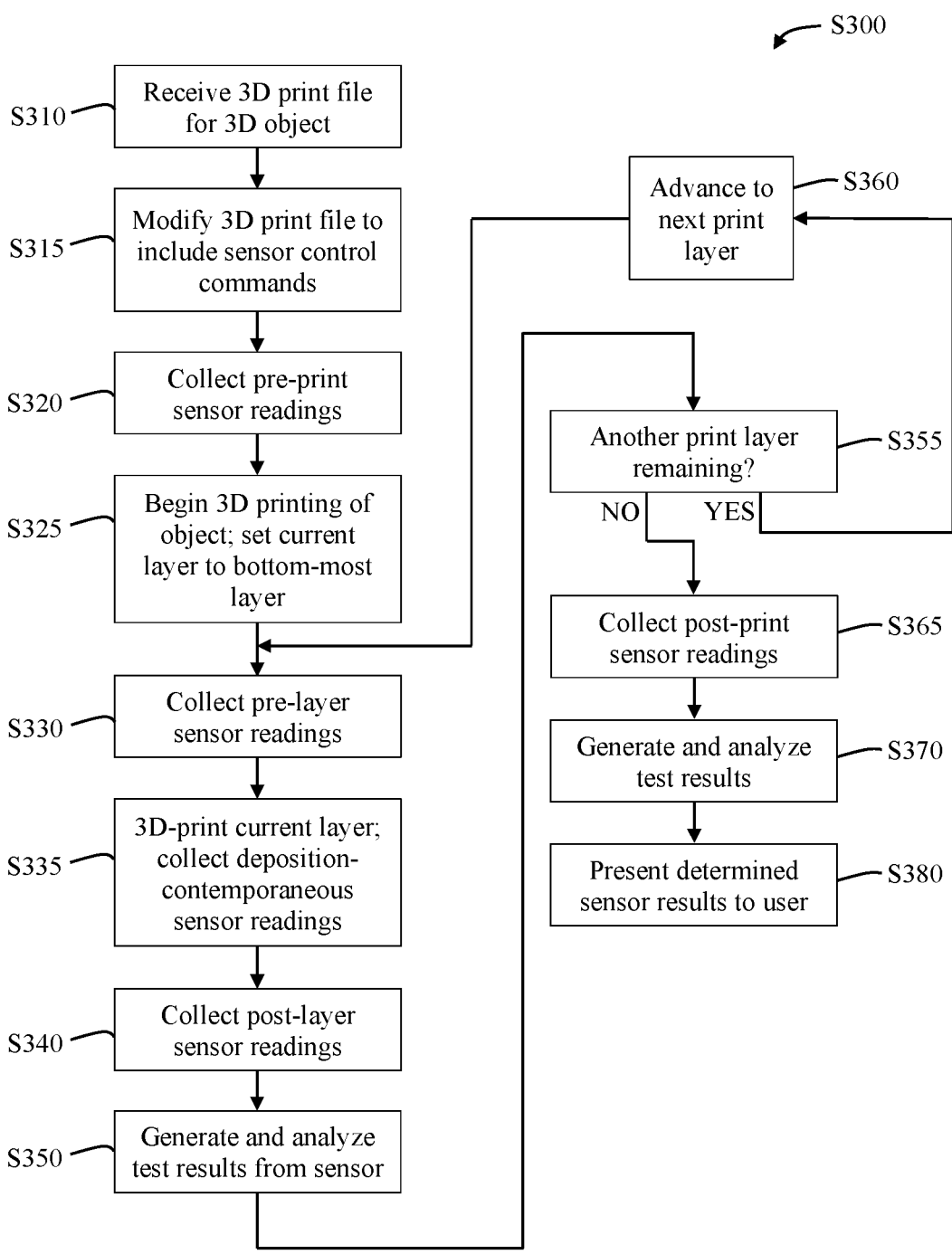
FIG. 3 is a flow chart for performing 3D-printing of an object with a comprehensive testing protocol, in accordance with one embodiment.

FIG. 3 illustrates an operation S300 for performing a printing operation with a comprehensive testing protocol, according to one embodiment.

First, in step S310, the controller 20 receives a 3D print file relating to a 3D object to be printed. The controller 20 may load the print commands within the 3D print file into memory 21. The print commands may include, e.g., motion commands, specifications of print materials, etc.

In step S315, the controller 20 modifies the 3D print file to include sensor control commands of the sensor set 200, for execution of sensor reading operations. The modification of the 3D print file may include commands for controlling measurement components (e.g., sensors within sensor set 200) and/or movement components (e.g., motors 116, 118) to perform measurements during the 3D printing operation. The controller 20 utilizes the modified 3D print file in the printing operation. In one embodiment where the original 3D print file was formed to already include the control commands, the modification in step S315 is not necessary and this step may be skipped.

In step S320, the controller 20 collects pre-print sensor readings. In particular, the controller 20 controls the sensor set 200 to collect pre-print sensor readings, according to pre-print sensor control commands in the modified 3D print file. Examples of pre-print sensor readings may include, but are not limited to:

sensor readings used to confirm an acceptable printer state
(e.g., sensor readings from the laser scanner, camera,
height sensor, distance measurement sensor, and/or
encoder(s), to confirm that the build platen 16 is
positioned in the correct location), sensor readings used to confirm an acceptable mainte-
nance state (e.g., sensor readings from the encoders,
accelerometers, and/or temperature sensors, to confirm
that the printer does not require any maintenance,
calibration, component replacement, or any other issue
that requires addressing), sensor readings used to confirm an acceptable safety state
(e.g., sensor readings to confirm that a safety visor is
down), and/or any other relevant sensor readings.

The controller 20 receives the pre-print sensor readings
from the respective sensors in the sensor set 200 and stores
the sensor readings in the memory 21.

In step S325, the controller 20 initiates the 3D-printing
operation of the object, setting the current layer to be printed
as the bottom-most print layer.

In step S330, the controller 20 collects pre-layer sensor
readings. In particular, the controller 20 controls the sensor
set 200 to collect pre-layer sensor readings, according to
pre-layer sensor control commands in the modified 3D print
file. Examples of pre-layer sensor readings may include, for
example, height measurements and/or imaging of the pre-
print layer. The controller 20 receives the pre-layer sensor
readings from the respective sensors in the sensor set 200
and stores the sensor readings in the memory 21.

In step S335, the controller 20 controls the motors 116,
118 with motor commands, and causes the print head(s) 10,
18 to print the current layer based on print head assembly
movement commands and extruder commands for the cur-
rent layer, as defined in the modified 3D print file. During the
printing of the current layer, the controller 20 also collects
deposition-contemporaneous sensor readings. In particular,
the controller 20 controls the sensor set 200 to collect
deposition-contemporaneous sensor readings, according to
deposition-contemporaneous sensor control commands in
the modified 3D print file. Examples of deposition-contem-
poraneous sensor readings may include, for example, height
measurements and/or sensor readings to confirm correct
apparatus operation. The controller 20 receives the deposi-
tion-contemporaneous sensor readings from the respective
sensors in the sensor set 200 and stores the sensor readings
in the memory 21.

In step S340, the controller 20 collects post-layer sensor
readings. In particular, the controller 20 controls the sensor
set 200 to collect post-layer sensor readings, according to
post-layer sensor control commands in the modified 3D print
file. Examples of post-layer sensor readings may include, for
example, height measurements and/or imaging of the post-
print layer. The controller 20 receives the post-layer sensor
readings from the respective sensors in the sensor set 200
and stores the sensor readings in the memory 21.

In step S350, the controller 20 generates and analyzes test
results from the sensor readings, in accordance with the
particular in-process tests being performed. Depending on
set conditions, a failure conclusion based on the test results In step S355, the controller 20 determines whether
another print layer remains to be printed for the object. If
another print layer remains to be printed, the operation
proceeds to step S360. If the current print layer is the final
print layer, the operation proceeds to step S365.

In step S360, the controller 20 increments the current print
layer to the next layer, thereby advancing to the next layer.

Generally, the next layer is the successive layer upwards in
height. The operation then returns to step S330.

In step S365, the controller 20 collects post-print sensor
readings. In particular, the controller 20 controls the sensor
set 200 to collect post-print sensor readings, according to
post-print sensor control commands in the modified 3D print
file. Examples of post-print sensor readings may include, but
are not limited to sensor readings to confirm correct appa-
ratus status.

The controller 20 receives the post-print sensor readings
from the respective sensors in the sensor set 200 and stores
the sensor readings in the memory 21.

In step S370, the controller 20 generates and analyzes any
remaining test results from the sensor readings.

In step S380, the controller 20 presents the generated test
results to the user.

It will be appreciated that instead of the sensor commands
being embedded in the 3D print file to form the modified 3D
print file, the sensor commands may be stored in a separate
file or otherwise as instructions separate from the 3D print
file, to nonetheless be executed during the 3D printing
operation.

In one embodiment, steps pertaining to generating and/or
analyzing test results are performed after completion of the
print operation, rather than during the print operation. In one
embodiment, these steps are performed by a remote com-
puting platform instead of the controller 20, as described in
further detail below.

It will be appreciated that while the measurement steps
may increase the overall time required to complete a print
operation, such steps provide an efficient approach to collect
measurement data and confirm accuracy of the print opera-
tion. Moreover, in some instances, the overall required time
may not increase substantially, as (i) the measurement
operation may be faster than the printing operation, and (ii)
a print operation customarily does not involve the applica-
tion of print material across the entire build platen.

Figure 4:
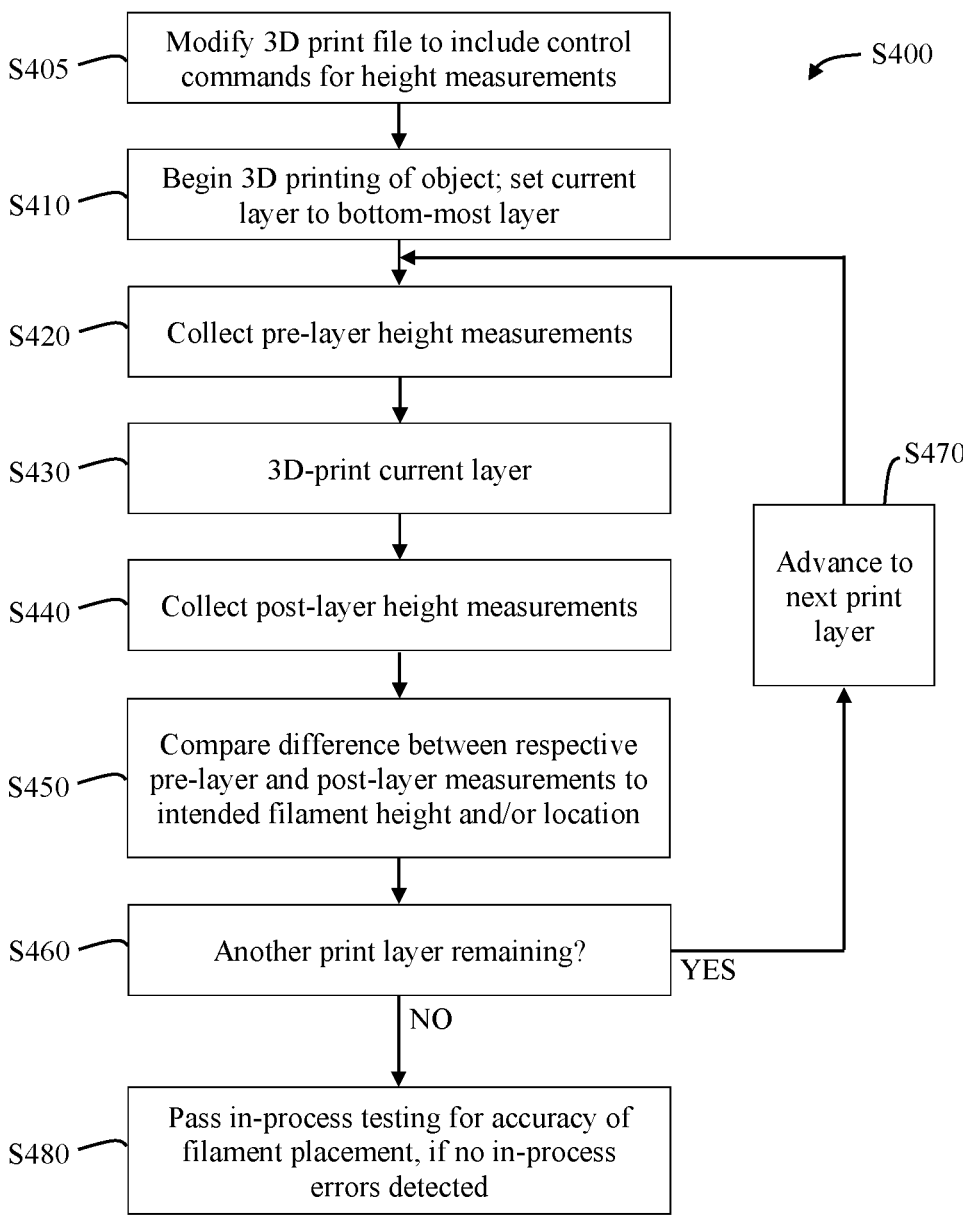
FIG. 4 is a flow chart for verifying accuracy of fiber placement, in accordance with one embodiment.

Operation to Verify Accuracy of Filament Placement, with
Layer-by-Layer Comparison FIG. 4 illustrates an operation S400 for performing an
operation to verify accuracy of filament placement during a
3D printing operation using a layer-by-layer comparison,
according to one embodiment. The subject filament may
include, but is not limited to, plastics and/or fiber reinforced
materials. The operation S400 may be incorporated within
the overall 3D printing operation of S300.

In step S405, the controller 20 modifies an original 3D
print file, to generate a modified 3D print file. The modifi-
cations to the original 3D print file may include the addition
of commands for controlling measurement components
(e.g., sensors within sensor set 200) and/or movement com-
ponents (e.g., motors 116, 118) to perform the subsequent
pre-layer measurements in step S420 and the post-layer
height measurement readings in step S440. Step S405 may
be incorporated within step S315 of operation S300. In one
embodiment where the original 3D print file was formed to
already include the control commands, the modification in
step S405 is not necessary and this step may be skipped.

In step S410, the controller 20 initiates the 3D-printing
operation of the object, setting the current layer to be printed
as the bottom-most print layer. Step S410 may be incorpo-
rated within step S325 of operation S300.

In step S420, the controller 20 collects pre-layer height
measurement readings of the object being printed, in its state
prior to printing the current layer, using a measurement
sensor of the sensor set 200. In one embodiment, the
measurement sensor being used is the laser scanner 15, height sensor 220, distance measurement sensor 230, or ultrasonic sensor 240. In configurations where the measurement sensor (e.g., laser scanner 15) of the sensor set 200 moves in the X-Y direction to perform measurements, the controller 20 performs measurement scans along the path that the filament is to be deposited in the current layer. That is, the controller 20 (i) causes the measurement sensor to traverse the same path as the path of filament deposition for the current layer, as defined in the modified 3D print file, and (ii) controls the measurement sensor to collect measurements at measurement locations along this traversed path prior to deposition of filament for the current layer. For instance, if the laser scanner 15 is being used as the measurement sensor, the controller 20 may control the motors 116, 118 with motor commands to control the movement of the laser scanner 15 (e.g., which may be mounted on print head(s) 10, 18) to traverse the path of filament deposition for the current layer, and may control the laser scanner 15 to collect depth/height measurements at certain measurement locations. In one embodiment, the measurement locations along the traversal path for the current layer are spaced at intervals. In one embodiment, the intervals are evenly spaced along the traversal path. In one embodiment, the intervals are more closely spaced in certain segments of the traversal path, such as segments that are curved and/or are more complex in profile, so as to provide a greater concentration of measurement points for those segments. In one embodiment, measurement locations are more concentrated in areas of filament deposition having higher significance (e.g., load-bearing areas or other areas requiring confirmation of structural rigidity, or areas where filament accuracy is especially vital). In one embodiment, for some or all of the measurement locations along the traversal path, multiple measurements may be collected for that measurement location, such as in a direction different from the path traversal direction. For instance, for a single measurement location, multiple measurements may collected in the width direction tangential to the path traversal direction. It will also be appreciated that a fixed measurement sensor (e.g., fixed camera) may also be used to collect the height measurements, in which case the X-Y movement may be unnecessary. Step S420 may be incorporated within step S330 of operation S300.

In step S430, the controller 20 controls the motors 116, 118 with motor commands, and causes the print head(s) 10, 18 to print the current layer based on print head assembly movement commands and extruder commands for the current layer, as defined in the modified 3D print file. In one embodiment, the movement path for extruding filament in this step may generally coincide with the desired location for print material deposition, and the movement path may likewise generally align with the movement path of measurements traversed in step S420. In one embodiment, the movement path for extruding filament in this step may deviate from the desired location for print material deposition. For instance, movement compensation may be applied to provide offset(s) between the material deposition location and the movement path, such as overshooting or undershooting a corner or curve, to ensure that the extruded material is applied at the desired location. In such a configuration, the movement path for extruding filament may likewise deviate from the movement path of the measurements traversed in step S420 and measuring the desired location of the deposited print material. Step S430 may be incorporated within step S335 of operation S300.

In step S440, the controller 20 collects post-layer measurement readings of the object being printed, in its state where the current layer has been printed (e.g., filament deposition has occurred). In one embodiment, the controller 20 controls the same measurement sensor used in step S420, in the same manner as in step S420. For instance, where a measurement sensor (e.g., laser scanner 15) of the sensor set 200 was moved in the X-Y direction along a traversal path to collect measurements, the controller causes the same measurement sensor to traverse the same path and collect measurements at the same measurement locations. Step S440 may be incorporated within step S340 of operation S300.

In step S450, the controller 20 determines, for each measurement location, whether the difference between the pre-layer height measurement and the post-layer height measurement either (i) is greater than the intended filament height plus a tolerance amount or (ii) is less than the intended filament height minus a tolerance amount. If either scenario is true, the controller 20 concludes that an error exists in the filament deposition relative to the expected 3D printing operation. That is, the deposition of the filament at a measurement location in printing the current layer should, with a correct filament deposition operation, result in a height difference between the pre-layer and post-layer height measurements according to the height of the filament.

In an alternative embodiment, measurement locations that (i) have an expected post-layer height measurement in the previous layer and (ii) have the intended post-layer height measurement in the current layer, within tolerance, are considered correct, while measurement locations beyond such tolerance are considered failed. This approach provides, in addition to a verification that the relative height is acceptable, an additional verification that the absolute heights of the measurement locations in the previous and current layers are acceptable.

Optionally, in an embodiment where multiple measurements were taken for a measurement location in a different direction than the path traversal direction (e.g., in the width direction), the pre-layer and post-layer difference may be analyzed for each such height measurement, to confirm whether the filament was deposited at the correct location in the X-Y plane or whether an error exists between the intended and actual filament deposition locations. If the controller 20 determines that an error exists, the controller 20 may conclude a failure of the 3D printing operation based on in-process testing. Depending on the configuration of the apparatus (e.g., user settings), the controller 20 may terminate the 3D printing operation based on such a detected failure. Alternatively, the controller 20 may provide a notification to the user of such failure, while still providing the option to continue the 3D printing operation. If the controller 20 does not determine an error, the controller 20 concludes that the current layer was correctly printed, and the operation proceeds to step S460. Step S450 may be incorporated within step S350 of operation S300.

In step S460, the controller 20 determines whether another print layer remains to be printed for the object. If another print layer remains to be printed, the operation proceeds to step S470. If the current print layer is the final print layer, the operation proceeds to step S480. Step S460 may be incorporated within step S355 of operation S300.

In step S470, the controller 20 increments the current print layer to the next layer, thereby advancing to the next layer. Generally, the next layer is the successive layer upwards in height. The operation then returns to step S420. Step S470 may be incorporated within step S360 of operation S300.

In step S480, if no errors were determined, the controller 20 determines that the 3D printing operation has passed in-process testing for accuracy of filament placement.

In an alternative embodiment, instead of the controller 20 determining whether the height measurement differences result in an error, the height measurement differences are presented to a user to make such determination. In one embodiment, the user's determinations are used to train the controller 20 in making such determinations in subsequent 3D printing operations.

In one embodiment, step S450 of comparing the difference between pre-layer and post-layer measurements is performed after completion of the print operation, rather than during the print operation. In one embodiment, step S450 is performed by a remote computing platform instead of the controller 20, as described in further detail below.

Operation to Verify Accuracy of Filament Placement, with Comparison to Previous Successful Print FIG. 5 illustrates an operation S500 for performing an operation to verify accuracy of filament placement during a 3D printing operation by comparison with a prior print operation, according to one embodiment. In particular, the operation S500 determines print accuracy of the current print operation by comparing sensor readings collected in the current printing operation with those collected in a previous printing operation, where the resulting 3D object produced by the previous printing operation has already been independently verified as accurate (e.g., by destructive testing or X-ray examination). The subject filament may include, but is not limited to, plastics and/or fiber reinforced materials. The operation S500 may be incorporated within the overall 3D printing operation of S300.

In step S505, the controller 20 modifies an original 3D print file, to generate a modified 3D print file. The modifications to the original 3D print file may include the addition of commands for controlling measurement components (e.g., sensors within sensor set 200) and/or movement components (e.g., motors 116, 118) to perform the subsequent measurements in steps S520 and S560. Step S505 may be incorporated within step S315 of operation S300. In one embodiment where the original 3D print file was formed to already include the control commands, the modification in step S505 is not necessary and this step may be skipped.

In step S510, the controller 20 initiates the 3D-printing operation of a first iteration of the object, setting the current layer to be printed as the bottom-most print layer.

In step S515, the controller 20 controls the motors 116, 118 with motor commands, and causes the print head(s) 10, 18 to print the current layer based on print head assembly movement commands and extruder commands for the current layer, as defined in the modified 3D print file.

In step S520, the controller 20 collects post-layer height measurement readings of the object being printed, in its state after printing the current layer, using a measurement sensor of the sensor set 200. In one embodiment, the measurement sensor being used is the laser scanner 15, height sensor 220, distance measurement sensor 230, or ultrasonic sensor 240. In configurations where the measurement sensor (e.g., laser scanner 15) of the sensor set 200 moves in the X-Y direction to perform measurements, the controller 20 performs measurement scans along the path that the filament is to be deposited in the current layer. That is, the controller 20 (i) causes the measurement sensor to traverse the same path as the path of filament deposition for the current layer, as defined in the modified 3D print file, and (ii) controls the measurement sensor to collect measurements at measurement locations along this traversed path subsequent to deposition of filament for the current layer. For instance, if the laser scanner 15 is being used as the measurement sensor, the controller 20 may control the motors 116, 118 with motor commands to control the movement of the laser scanner 15 (e.g., which may be mounted on print head(s) 10, 18) to traverse the path of filament deposition for the current layer, and may control the laser scanner 15 to collect depth/height measurements at certain measurement locations. In one embodiment, the measurement locations along the traversal path for the current layer are spaced at intervals. In one embodiment, the intervals are evenly spaced along the traversal path. In one embodiment, the intervals are more closely spaced in certain segments of the traversal path, such as segments that are curved and/or are more complex in profile, so as to provide a greater concentration of measurement points for those segments. In one embodiment, measurement locations are more concentrated in areas of filament deposition having higher significance (e.g., load-bearing areas or other areas requiring confirmation of structural rigidity, or areas where filament accuracy is especially vital). In one embodiment, for some or all of the measurement locations along the traversal path, multiple measurements may be collected for that measurement location, such as in a direction different from the path traversal direction. For instance, for a single measurement location, multiple measurements may collected in the width direction tangential to the path traversal direction. It will also be appreciated that a fixed measurement sensor (e.g., fixed camera) may also be used to collect the height measurements, in which case the X-Y movement may be unnecessary.

In step S525, the controller 20 determines whether another print layer remains to be printed for the first iteration of the object. If another print layer remains to be printed, the operation proceeds to step S530. If the current print layer is the final print layer, the operation proceeds to step S540.

In step S530, the controller 20 increments the current print layer to the next layer, thereby advancing to the next layer. Generally, the next layer is the successive layer upwards in height. The operation then returns to step S515.

In step S540, an examination is conducted on the first iteration of the printed object to determine whether the printed object is satisfactory. For instance, various post-print methods, such as destructive or non-destructive testing, may be performed on the first iteration of the printed object to determine whether the object is satisfactory. As another example, the operation S400 described above, the operations S700, S900, and/or S1100 described below, and/or any other verification operations may be performed to determine whether the object is satisfactory.

In step S550, the controller 20 initiates the 3D-printing operation of a second iteration of the object, setting the current layer to be printed as the bottom-most print layer. Step S550 may be incorporated within step S325 of operation S300.

In step S555, the controller 20 controls the motors 116, 118 with motor commands, and causes the print head(s) 10, 18 to print the current layer based on print head assembly movement commands and extruder commands for the current layer, as defined in the modified 3D print file. Step S555 may be incorporated within step S335 of operation S300.

In step S560, the controller 20 collects post-layer height measurement readings of the object being printed, in its state after printing the current layer, using a measurement sensor of the sensor set 200. The approach to collect measurement readings in this step may be identical to the approach used in step S520 for the first iteration of the printed object, to facilitate a comparison of measurement readings between the first and second iterations of the printed object in corresponding print layers. Step S560 may be incorporated within step S340 of operation S300.

In step S565, the controller 20 compares the height measurements for the current layer with the height measurements collected in step S520, when printing the same current layer for the first iteration of the printed object. For instance, the controller 20 determines, for each measurement location, whether the difference between the height measurement for the current layer (in printing the second iteration of the printed object) and the height measurement for the same layer when printing the first iteration of the printed object exceeds a threshold. If the threshold is exceeded, the controller 20 concludes that an error exists in the filament deposition relative to the expected 3D printing operation as performed for the first iteration of the printed object. Optionally, in an embodiment where multiple measurements were taken for a measurement location in a different direction than the path traversal direction (e.g., in the width direction), the height differences in this different direction may be analyzed for each such height measurement, to confirm whether the filament was deposited at the correct location in the X-Y plane or whether an error exists between the current filament deposition locations and the previous filament deposition locations during printing of the first iteration of the printed object. If the controller 20 determines that an error exists, the controller 20 may conclude a failure of the 3D printing operation based on in-process testing. Depending on the configuration of the apparatus (e.g., user settings), the controller 20 may terminate the 3D printing operation based on such a detected failure. Alternatively, the controller 20 may provide a notification to the user of such failure, while still providing the option to continue the 3D printing operation. If the controller 20 does not determine an error, the controller 20 concludes that the current layer was correctly printed, and the operation proceeds to step S570. Step S565 may be incorporated within step S350 of operation S300.

In step S570, the controller 20 determines whether another print layer remains to be printed for the second iteration of the object. If another print layer remains to be printed, the operation proceeds to step S530. If the current print layer is the final print layer, the operation proceeds to step S540. Step S570 may be incorporated within step S355 of operation S300.

In step S575, the controller 20 increments the current print layer to the next layer, thereby advancing to the next layer. Generally, the next layer is the successive layer upwards in height. The operation then returns to step S555. Step S575 may be incorporated within step S360 of operation S300.

In step S580, if no errors were determined, the controller 20 determines that the 3D printing operation has passed in-process testing for accuracy of filament placement in the second iteration of the printed object.

In an alternative embodiment, instead of the controller 20 determining whether the comparisons of height measurements between the first and second iterations of the printed object result in an error, the height measurement differences are presented to a user to make such determination. In one embodiment, the user's determinations are used to train the controller 20 in making such determinations in subsequent 3D printing operations.

In one embodiment, step S565 of comparing the measurements is performed after completion of the print operation, rather than during the print operation. In one embodiment, step S565 is performed by a remote computing platform instead of the controller 20, as described in further detail below.

Operation to Verify Accuracy of Infill Density

Figure 6A:
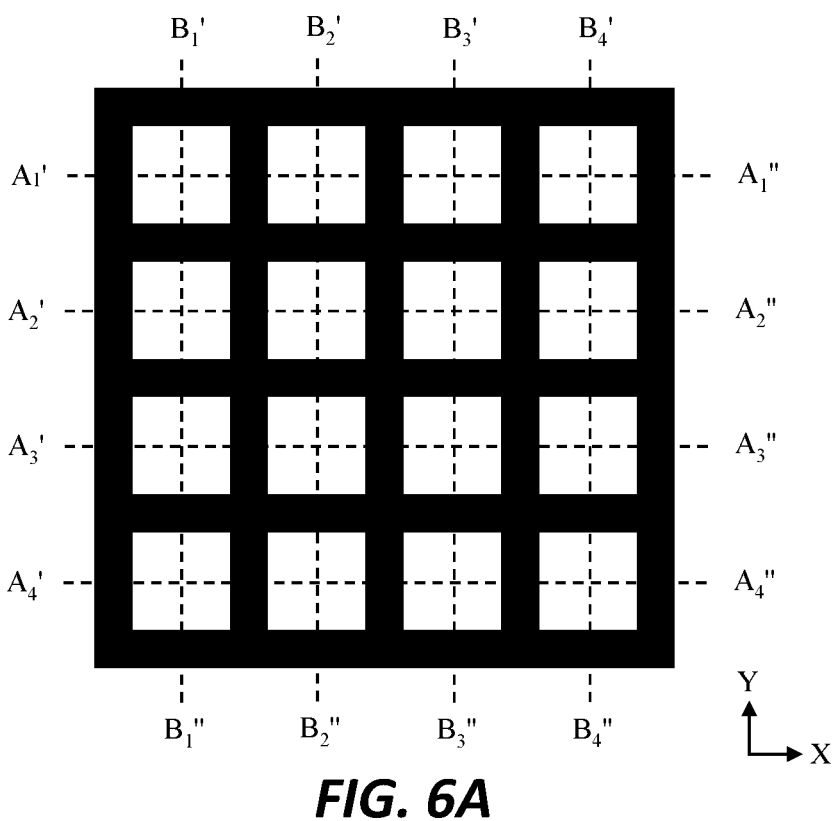
FIGS. 6A-6C illustrate examples of infill density measurements of an example 3D object being printed, in accordance with one embodiment.
Figure 6B:
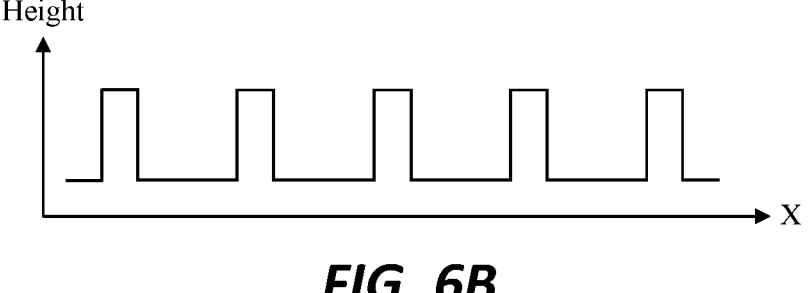
Figure 6C:
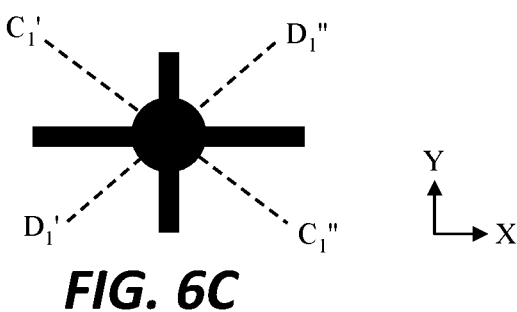

FIGS. 6A-6C illustrate measurements of the infill of an example 3D object being printed, to determine infill density in accordance with one embodiment. As the example illustrated in FIG. 6A, the 3D object being printed is a square outline having a grid infill pattern formed in its interior. That is, the grid infill pattern includes infill lines extending in the X direction and infill lines extending in the Y direction.

In one embodiment, the laser scanner 15 or another movement-based height/depth measurement sensor within the sensor set 200 is used to perform height measurements. To measure the infill density, measurement scans are performed perpendicular to each of the major infill directions, at regular intervals. Referring to the example of FIG. 6A, measurement scans are performed along the X direction to measure the Y-direction infill lines, and measurement scans are performed along the Y direction to measure the X-direction infill lines.

For instance, a measurement scan is performed along A1'-A1" in the X direction (horizontal in the orientation of FIG. 6A) to measure the Y-direction infill lines, and additional measurement scans are performed in the X direction at regular intervals (e.g., along A2'-A2", along A3'-A3", along A4'-A4"). Similarly, a measurement scan is performed along B1'-B1" in the Y direction (vertical in the orientation of FIG. 6A) to measure the X-direction infill lines, and additional measurement scans are performed in the Y direction at regular intervals (e.g., along B2'-B2", along B3'-B3", along B4'-B4").

FIG. 6B illustrates an example result from a measurement scan performed in the X direction (e.g., the scan along A1'-A1"). As shown in FIG. 6B, the results reveal peaks where an infill line is present, and the width of the peaks reflect the effective density of the infill along that scan direction (e.g., by averaging the widths).

By compiling (e.g., averaging) all the measurement scans corresponding to each of the major fill directions, the overall effective density of the 3D object may be determined.

Additional measurements may be performed to provide even more increased accuracy of infill density. For example, as illustrated in FIG. 6C, intersections of printed infill beads may, in some instances, result in excess material at the intersection area. Where measurement scans performed perpendicular to a major fill direction may not capture the presence of this excess material (which affects the overall effective infill density), additional scans may be performed along different directions to detect this excess material. For example, additional measurement scans may be performed along $C_1'$-$C_1"$ and/or along $D_1'$-$D_1"$, to measure the excess intersection material and its influence on overall infill density.

Figure 7:
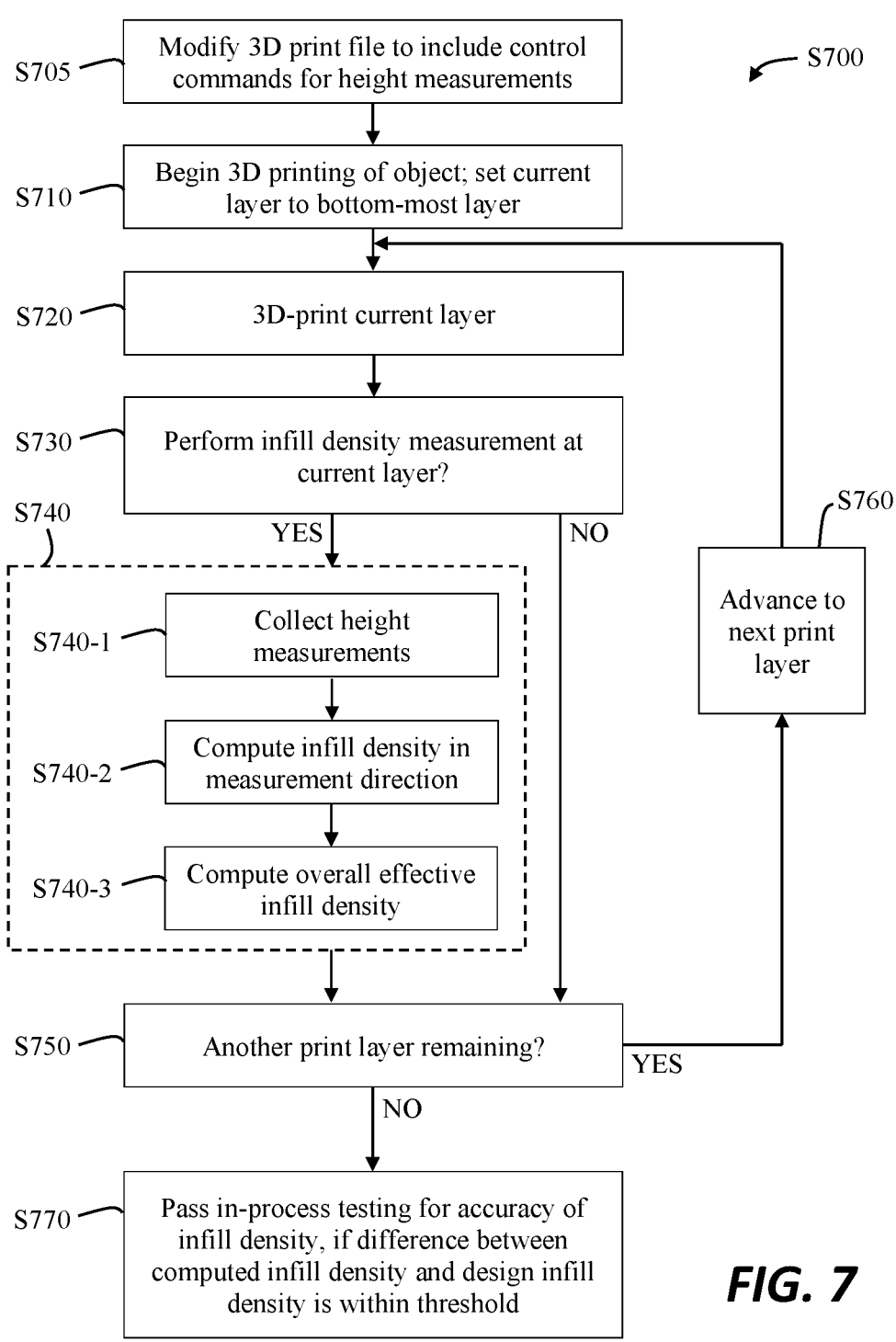
FIG. 7 is a flow chart for verifying accuracy of infill density, in accordance with one embodiment.

FIG. 7 illustrates an operation S700 for performing an operation to verify infill density during a 3D printing operation, according to one embodiment. The operation S700 may be incorporated within the overall 3D printing operation of S300.

In step S705, the controller 20 modifies an original 3D print file, to generate a modified 3D print file. The modifications to the original 3D print file may include the addition of commands for controlling measurement components (e.g., sensors within sensor set 200) and/or movement components (e.g., motors 116, 118) to perform the measurements in step S740. Step S705 may be incorporated within step S315 of operation S300. In one embodiment where the original 3D print file was formed to already include the control commands, the modification in step S705 is not necessary and this step may be skipped.

In step S710, the controller 20 initiates the 3D-printing operation of the object, setting the current layer to be printed as the bottom-most print layer. Step S710 may be incorporated within step S325 of operation S300.

In step S720, the controller 20 controls the motors 116, 118 with motor commands, and causes the print head(s) 10, 18 to print the current layer based on print head assembly movement commands and extruder commands for the current layer, as defined in the modified 3D print file. Step S720 may be incorporated within step S335 of operation S300.

In step S730, the controller 20 determines whether an infill density measurement should be performed at the current layer. Such determination may be dependent on a variety of conditions such as, but not limited to, (i) user preference (e.g., whether the user has indicated a preference to perform the infill density measurement at all or selected print layers), (ii) whether the subsequent print layer after the current layer will obscure (e.g., cover) the existing deposited infill pattern and prevent measurements from being conducted during printing of that subsequent layer, and/or (iii) whether the current layer is the final layer to be printed. If the controller 20 determines that an infill density measurement is to be performed at the current layer, the operation proceeds to step S740. Otherwise, the operation proceeds to step S750.

In step S740, the controller 20 determines an overall infill density for the 3D object in its current state, by collecting measurements of the object using a measurement sensor of the sensor set 200 and analyzing the measurement results. In one embodiment, the measurement sensor being used is the laser scanner 15, height sensor 220, distance measurement sensor 230, or ultrasonic sensor 240, and step S740 is performed by performing steps S740-1, S740-2, and S740-3. In one embodiment, the measurement sensor being used is the camera 210.

In step S740-1, the controller 20 controls a measurement sensor to perform height measurements along paths perpendicular to one or more of the fill directions. For instance, in configurations where the measurement sensor (e.g., laser scanner 15) of the sensor set 200 moves in the X-Y direction to perform measurements, the controller 20 performs height measurement scans at measurement locations along paths, at preset intervals, perpendicular to one or more of the infill directions. An example of these measurement scans was described above with reference to FIG. 6A, where measurement scans are performed along $A_1'$-$A_1''$ through $A_4'$-$A_4''$ to measure Y-direction infill lines, measurement scans are performed along $B_1'$-$B_1''$ through $B_4'$-$B_4''$ to measure X-direction infill lines, and/or measurement scans are performed along $C_1'$-$C_1''$ and/or $D_1'$-$D_1''$ to measure excess intersection material. Such measurement scans may produce the results of the type illustrated in FIG. 6B. In one embodiment, measurement locations are more concentrated in areas of infill having higher significance (e.g., load-bearing areas or other areas requiring confirmation of structural rigidity).

In step S740-2, the controller 20 computes the density in each measurement direction, based on widths and frequencies of peaks from the measurement scan results. For instance, based on the example scan results illustrated in FIG. 6B, the controller 20 analyzes the width and frequency of the peaks of these measurement results, to determine an average infill density along the measurement direction.

In step S740-3, the controller 20 compute the overall effective infill density for the 3D object, based on the infill density calculations performed in each measurement direction in step S740-2. For instance, the controller 20 may average the infill density calculations performed in each measurement direction, to determine the overall effective infill density. It will also be appreciated that, in the scenario where a non-scanning measurement sensor is used for height measurements (e.g., fixed camera), steps S740-1 may involve one or more 2D measurements without the need for scanning, and the controller 20 may simply compute the overall effective infill density by analyzing these 2D measurements and avoid the interim computation of infill density along a particular direction in step S740-2.

In step S750, the controller 20 determines whether another print layer remains to be printed for the object. If another print layer remains to be printed, the operation proceeds to step S760. If the current print layer is the final print layer, the operation proceeds to step S770. Step S750 may be incorporated within step S355 of operation S300.

In step S760, the controller 20 increments the current print layer to the next layer, thereby advancing to the next layer. Generally, the next layer is the successive layer upwards in height. The operation then returns to step S720. Step S760 may be incorporated within step S360 of operation S300.

In step S770, the controller 20 compares the computed overall infill density to the intended infill density according to design information for the 3D object being printed. If the difference between the computed overall infill density and the intended infill density does not exceed a threshold, the controller 20 concludes that the 3D printing operation has passed in-process testing for accuracy of infill density and provides a corresponding notification to a user. If the difference between the computed overall infill density and the intended infill density exceeds the threshold, the controller 20 concludes that the 3D printing operation has failed in-process testing for accuracy of infill density and provides a corresponding notification to a user.

It will also be appreciated that the direction of the difference may also influence whether the testing is considered a pass or a fail. For instance, if the computed overall infill density exceeds the intended infill density by an amount greater than the threshold, the controller 20 may nonetheless determine that excess infill density is acceptable and consider such a scenario to pass the in-process testing for infill density.

In one embodiment, steps S740-2 and/or S740-3 are performed after completion of the print operation, rather than during the print operation. In one embodiment, steps 740-2 and/or S740-3 are performed by a remote computing platform instead of the controller 20, as described in further detail below.

Operation to Verify Accuracy of Shell Thickness

Figure 8A:
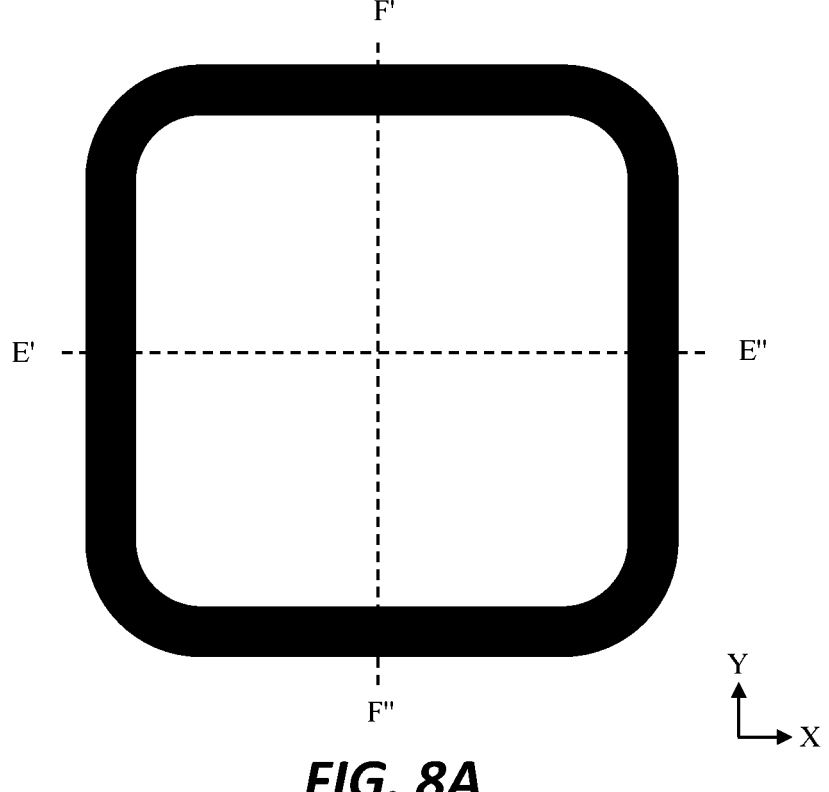
FIG. 8A-8B illustrate examples of shell thickness measurements of an example 3D object being printed, in accordance with one embodiment.
Figure 8B:
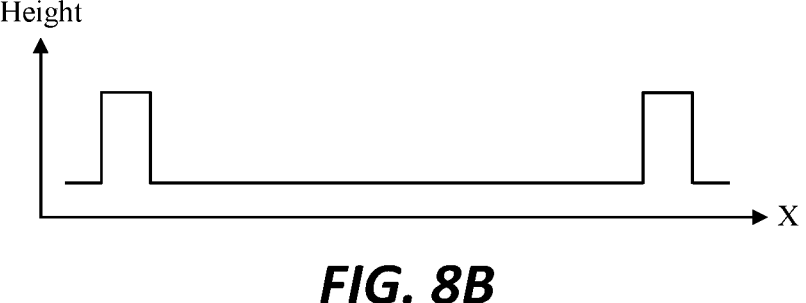

FIG. 8A-8B illustrate measurements of an example 3D object being printed, to determine shell thickness in accordance with one embodiment. As the example illustrated in FIG. 8A, the 3D object being printed has a rounded square X-Y profile defining a shell.

In one embodiment, the laser scanner 15 or another movement-based height/depth measurement sensor within the sensor set 200 is used to perform height measurements. To measure the shell thickness, measurement scans are performed perpendicular to each of the major shell edges. Referring to the example of FIG. 8A, one or more measurement scans are performed along the X direction to measure the shell thickness in the Y-direction, and one or more measurement scans are performed along the Y direction to measure the shell thickness in the X-direction.

For instance, a measurement scan is performed along E'-E" in the X direction (horizontal in the orientation of FIG. 8A) to measure the Y-direction shell thickness, and additional measurement scans (not shown) may be performed in the X direction (e.g., at regular intervals). Similarly, a measurement scan is performed along F'-F" in the Y direction (vertical in the orientation of FIG. 8A) to measure the X-direction shell thickness, and additional measurement scans (not shown) may be performed in the Y direction (e.g., at regular intervals).

FIG. 8B illustrates an example result from a measurement scan performed in the X direction (e.g., the scan along E'-E"). As shown in FIG. 8B, the results reveal peaks where the shell is present, and the width of the peaks reflect the effective thickness of the shell along that scan direction (e.g., by averaging the widths).

By compiling (e.g., averaging) all the measurement scans corresponding to each of the major shell directions, the overall effective shell thickness of the 3D object may be determined.

Figure 9:
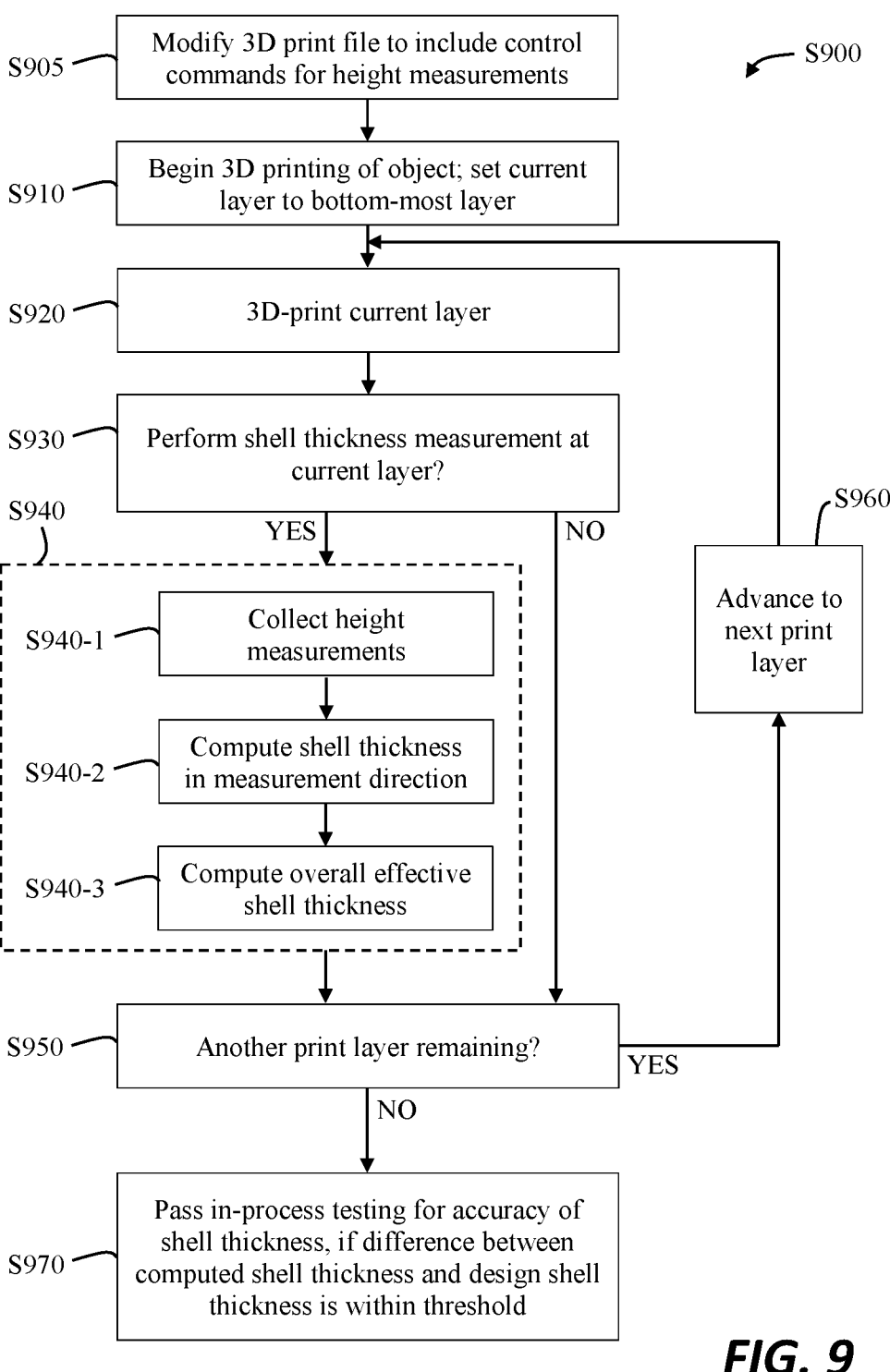
FIG. 9 is a flow chart for verifying accuracy of shell thickness, in accordance with one embodiment.

FIG. 9 illustrates an operation S900 for performing an operation to verify accuracy of shell thickness during a 3D printing operation based on a prior print operation, according to one embodiment. The operation S900 may be incorporated within the overall 3D printing operation of S300.

In step S905, the controller 20 modifies an original 3D print file, to generate a modified 3D print file. The modifications to the original 3D print file may include the addition of commands for controlling measurement components (e.g., sensors within sensor set 200) and/or movement components (e.g., motors 116, 118) to perform the measurements in step S940. Step S905 may be incorporated within step S315 of operation S300. In one embodiment where the original 3D print file was formed to already include the control commands, the modification in step S905 is not necessary and this step may be skipped.

In step S910, the controller 20 initiates the 3D-printing operation of the object, setting the current layer to be printed as the bottom-most print layer. Step S910 may be incorporated within step S325 of operation S300.

In step S920, the controller 20 controls the motors 116, 118 with motor commands, and causes the print head(s) 10, 18 to print the current layer based on print head assembly movement commands and extruder commands for the current layer, as defined in the modified 3D print file. Step S920 may be incorporated within step S335 of operation S300.

In step S930, the controller 20 determines whether a shell thickness measurement should be performed at the current layer. Such determination may be dependent on a variety of conditions such as, but not limited to, (i) user preference (e.g., whether the user has indicated a preference to perform the shell thickness measurement at all or selected print layers), (ii) whether the subsequent print layer after the current layer will obscure (e.g., cover) the existing deposited shell pattern and prevent measurements from being conducted during printing of that subsequent layer, and/or (iii) whether the current layer is the final layer to be printed. If the controller 20 determines that a shell thickness measurement is to be performed at the current layer, the operation proceeds to step S940. Otherwise, the operation proceeds to step S950.

In step S940, the controller 20 determines an overall shell thickness for the 3D object in its current state, by collecting measurements of the object using a measurement sensor of the sensor set 200 and analyzing the measurement results. In one embodiment, the measurement sensor being used is the laser scanner 15, height sensor 220, distance measurement sensor 230, or ultrasonic sensor 240, and step S940 is performed by performing steps S940-1, S940-2, and S940-3. In one embodiment, the measurement sensor being used is the camera 210.

In step S940-1, the controller 20 controls a measurement sensor to perform height measurements along paths perpendicular to one or more of the shell edges. For instance, in configurations where the measurement sensor (e.g., laser scanner 15) of the sensor set 200 moves in the X-Y direction to perform measurements, the controller 20 performs height measurement scans at measurement locations along one or more paths, at preset intervals, perpendicular to one or more of the shell edges. An example of these measurement scans was described above with reference to FIG. 8A, where one or more measurement scans are performed along E'-E" (and/or along parallel lines thereto) to measure shell thickness in the Y-direction, and one or more measurement scans are performed along F'-F" (and/or along parallel lines thereto) to measure shell thickness in the X-direction infill lines. Such measurement scans may produce the results of the type illustrated in FIG. 8B. In one embodiment, measurement locations are more concentrated in areas of the shell having higher significance (e.g., load-bearing areas or other areas requiring confirmation of structural rigidity).

In step S940-2, the controller 20 computes the shell thickness in each measurement direction, based on widths and frequencies of peaks from the measurement scan results. For instance, based on the example scan results illustrated in FIG. 8B, the controller 20 analyzes the width and frequency of the peaks of these measurement results, to determine an average shell thickness along the measurement direction.

In step S940-3, the controller 20 compute the overall effective shell thickness for the 3D object, based on the shell thickness calculations performed in each measurement direction in step S940-2. For instance, the controller 20 may average the infill shell thickness calculations performed in each measurement direction, to determine the overall effective shell thickness. It will also be appreciated that, in the scenario where a non-scanning measurement sensor is used for height measurements (e.g., fixed camera), steps S740-1 may involve one or more 2D measurements without the need for scanning, and the controller 20 may simply compute the overall effective shell thickness by analyzing these 2D measurements and avoid the interim computation of shell thickness along a particular direction in step S940-2.

In step S950, the controller 20 determines whether another print layer remains to be printed for the object. If another print layer remains to be printed, the operation proceeds to step S960. If the current print layer is the final print layer, the operation proceeds to step S970. Step S950 may be incorporated within step S355 of operation S300.

In step S960, the controller 20 increments the current print layer to the next layer, thereby advancing to the next layer. Generally, the next layer is the successive layer upwards in height. The operation then returns to step S920. Step S960 may be incorporated within step S360 of operation S300.

In step S970, the controller 20 compares the computed overall shell thickness to the intended shell thickness according to design information for the 3D object being printed. If the difference between the computed overall shell thickness and the intended shell thickness does not exceed a threshold, the controller 20 concludes that the 3D printing operation has passed in-process testing for accuracy of shell thickness and provides a corresponding notification to a user. If the difference between the computed overall shell thickness and the intended shell thickness exceeds the threshold, the controller 20 concludes that the 3D printing operation has failed in-process testing for accuracy of shell thickness and provides a corresponding notification to a user.

It will also be appreciated that the direction of the difference may also influence whether the testing is considered a pass or a fail. For instance, if the computed overall shell thickness exceeds the intended shell thickness by an amount greater than the threshold, the controller 20 may nonetheless determine that excess shell thickness is acceptable and consider such a scenario to pass the in-process testing for shell thickness.

In one embodiment, steps S940-2 and/or S940-3 are performed after completion of the print operation, rather than during the print operation. In one embodiment, steps 940-2 and/or S940-3 are performed by a remote computing platform instead of the controller 20, as described in further detail below.

Operation to Verify Insertion of Occluded Feature

FIGS. 10A-10E illustrate measurements of an example 3D object being printed, to verify the correct insertion of an external feature that is occluded, in accordance with one embodiment. As the example illustrated in FIGS. 10A, 10C, and 10E, the 3D object 1020 being printed includes a recess 1025 (see FIG. 10A) where an external feature 1030 is to be inserted (see FIG. 10C) and ultimately occluded by further printing (see FIG. 10E). For instance, the feature may be inserted by a user or by robotic operation during the 3D printing operation before the occlusion layers are printed.

In one embodiment, the laser scanner 15 or another movement-based height/depth measurement sensor within the sensor set 200 is used to perform height measurements. To verify the feature insertion, one or more first measurement scans are performed prior to the insertion of the feature. Referring to the example of FIG. 10A, the first measurement scans are performed to measure the height of the 3D object 1020 after the recess 1025 has been formed (but before the feature 1030 has been inserted).

Figures 10A, 10B, 10C, 10D, 10E:
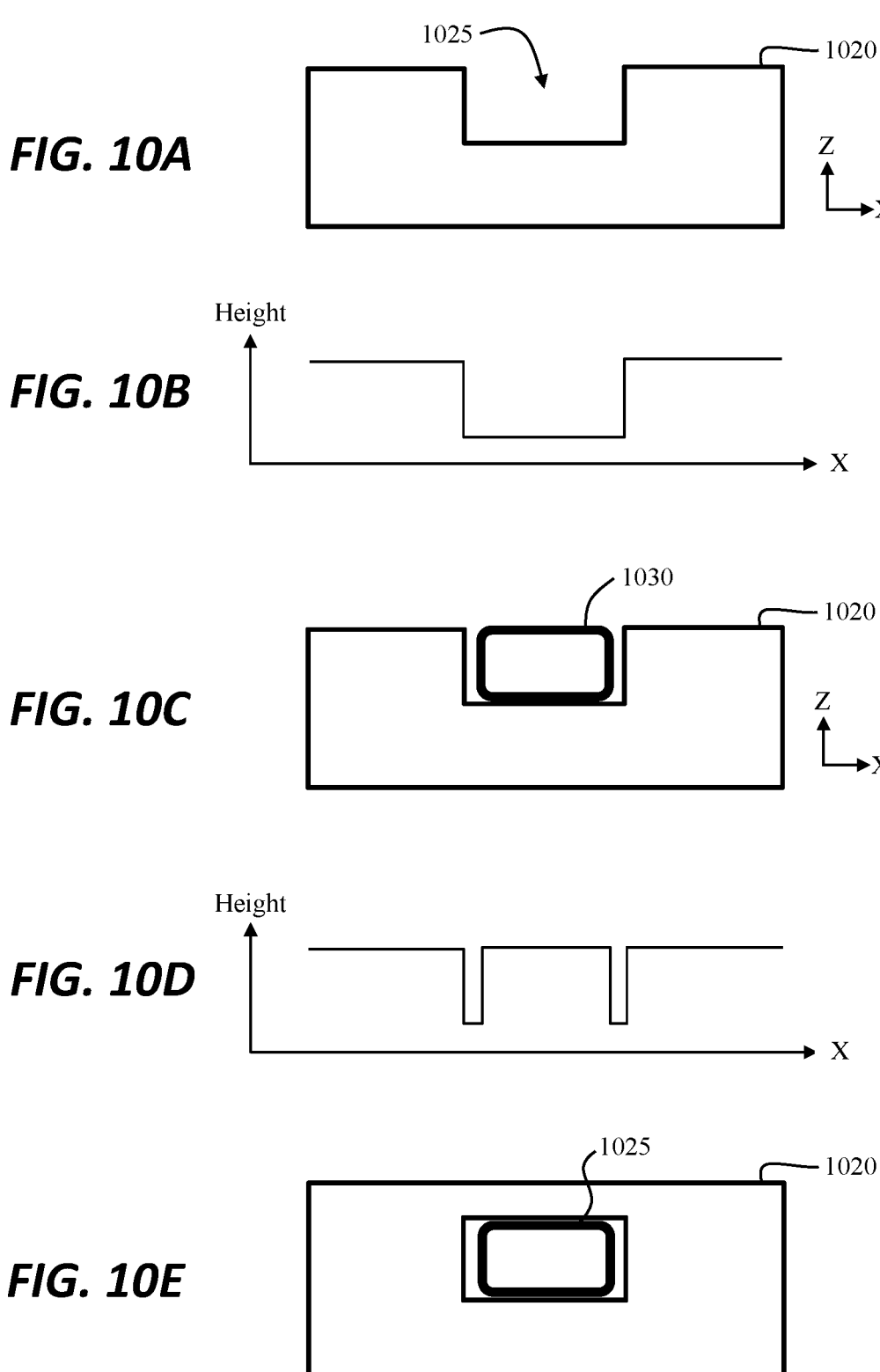
FIGS. 10A-10E illustrate examples of external feature insertion verification into an example 3D object being printed, in accordance with one embodiment.

FIG. 10B illustrates an example result from such first measurement scans. As shown in FIG. 10B, the results reveal the recess where the measured height is relatively decreased.

After the first measurement scans, the feature 1030 is inserted into the recess 1025, as illustrated in FIG. 10C. Afterwards, one or more second measurement scans are performed. Referring to the example of FIG. 10C, the second measurement scans are performed to measure the height of the 3D object 1020 (and the feature 1030) after the feature 1030 has been inserted.

FIG. 10D illustrates an example result from such first measurement scans. As shown in FIG. 10D, the results reveal the presence of the inserted feature 1030, where the measured height decreases when measuring the gap between inserted feature 1030 and the 3D object 1020 and the measured height increases when measuring the inserted feature 1030.

The second measurement scans are compared against the first measurement scans, to verify one or more of (i) the presence of the inserted feature 1030, (ii) the correct inserted feature 1030 (e.g., based on the measured increase in height based on the inserted feature 1030 matching the known height of the inserted feature 1030), and (iii) the correct insert positioning of the inserted feature 1030 (e.g., measured gaps in FIG. 10D match the expected measurements).

After the inserted feature 1030 has been verified as being correctly inserted, the remaining layers are formed to occlude the inserted feature 1030, as illustrated in FIG. 10E.

Figure 11:
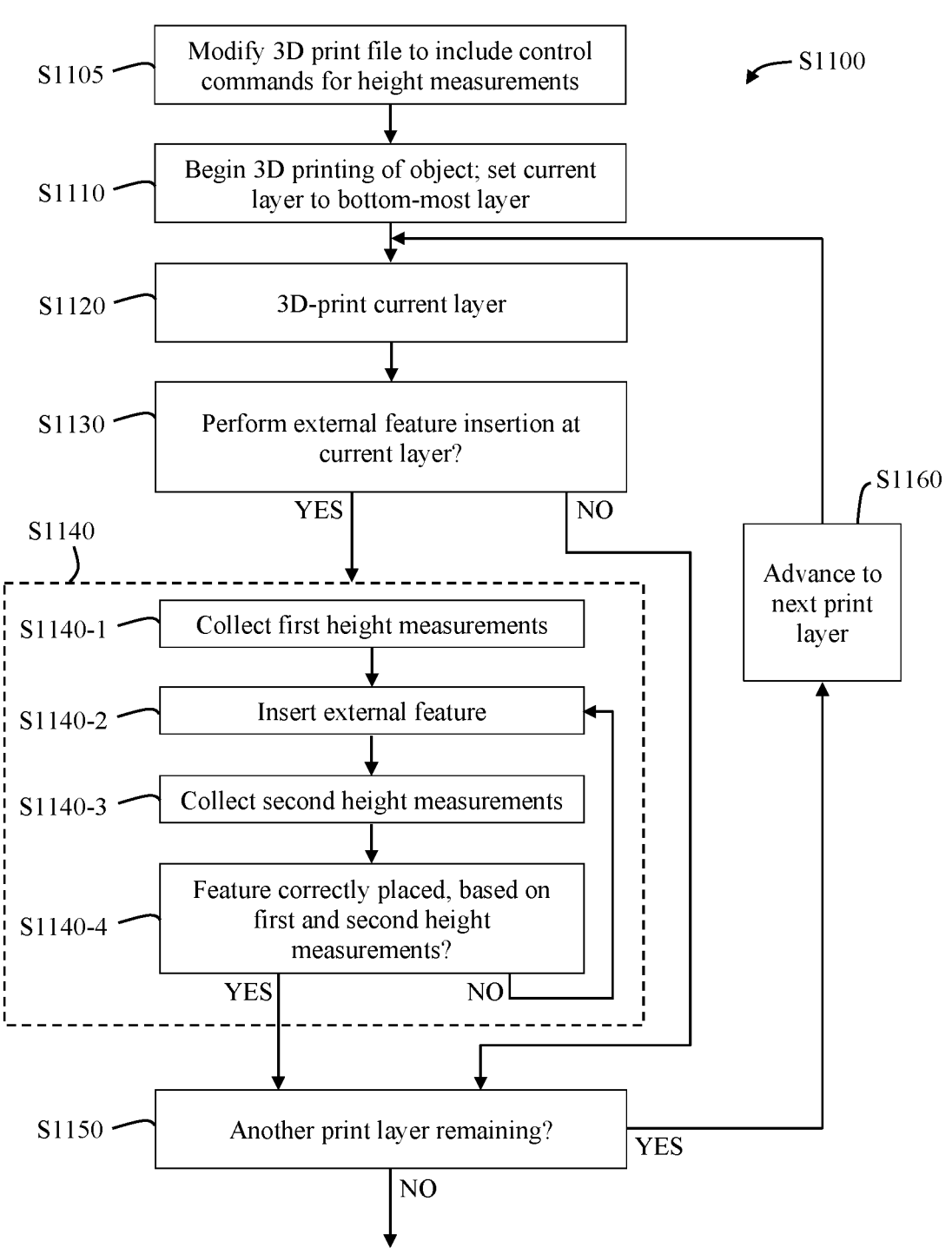
FIG. 11 is a flow chart for performing scanning to determine accuracy of occluded features, in accordance with one embodiment.

FIG. 11 illustrates an operation S1100 for performing an operation to verify the insertion of a feature that is occluded, during a 3D printing operation according to one embodiment. The operation S1100 may be incorporated within the overall 3D printing operation of S300.

In step S1105, the controller 20 modifies an original 3D print file, to generate a modified 3D print file. The modifications to the original 3D print file may include the addition of commands for controlling measurement components (e.g., sensors within sensor set 200) and/or movement components (e.g., motors 116, 118) to perform the measurements in steps S1140-1 and S1140-3. Step S1105 may be incorporated within step S315 of operation S300. In one embodiment where the original 3D print file was formed to already include the control commands, the modification in step S1105 is not necessary and this step may be skipped.

In step S1110, the controller 20 initiates the 3D-printing operation of the object, setting the current layer to be printed as the bottom-most print layer. Step S1110 may be incorporated within step S325 of operation S300.

In step S1120, the controller 20 controls the motors 116, 118 with motor commands, and causes the print head(s) 10, 18 to print the current layer based on print head assembly movement commands and extruder commands for the current layer, as defined in the modified 3D print file. Step S1120 may be incorporated within step S335 of operation S300.

In step S1130, the controller 20 determines whether an external feature insertion should be performed at the current layer. Such determination may depend on, for instance, the design specifications for the 3D object being printed. If the controller 20 determines that the external feature insertion is to be performed at the current layer (e.g., the next layer involves printing portions which will occlude the area of insertion for the external feature), the operation proceeds to step S1140. Otherwise, the operation proceeds to step S1150.

In step S1140, the controller 20 controls the insertion of an external feature and verification of correct insertion, by collecting measurements of the object and the external feature using a measurement sensor of the sensor set 200 and analyzing the measurement results. In one embodiment, the measurement sensor being used is the laser scanner 15, height sensor 220, distance measurement sensor 230, or ultrasonic sensor 240, and step S1140 is performed by performing steps S1140-1, S1140-2, S1140-3, and S1140-4. In one embodiment, the measurement sensor being used is the camera 210.

In step S1140-1, the controller 20 controls a measurement sensor to perform first height measurements of the surface of the 3D object, as of the current print layer prior to insertion of the external feature. For instance, in configurations where the measurement sensor (e.g., laser scanner 15) of the sensor set 200 moves in the X-Y direction to perform measurements, the controller 20 performs one or more first height measurement scans at measurement locations along one or more paths, at preset intervals. An example of these measurement scans was described above with reference to FIGS. 10A and 10B, where one or more height measurement scans are performed along the top surface of the 3D object illustrated in FIG. 10A. Such first measurement scans may produce the results of the type illustrated in FIG. 10B. In one embodiment, the density of measurement points is higher in areas having higher significance (e.g., near the edges of where the external feature is expected to be inserted). Step S1140 may be incorporated within step S330 of operation S300.

In step S1140-2, the controller 20 controls the insertion of the external feature. For example, if the external feature is to be inserted manually by a user, the controller 20 controls a user output component (e.g., display) to provide instructions to the user on the insertion of the external feature. If the external feature is to be inserted automatically through a robotic component, the controller 20 controls such robotic component to insert the external feature. The insertion of an example external feature is illustrated in FIG. 10C.

In step S1140-3, the controller 20 controls the measurement sensor to perform second height measurements of the surface of the 3D object and the external feature, following the insertion of the external feature. In one embodiment, the controller 20 controls the same measurement sensor used in step S1140-1, in the same manner as in step S1140-1. For instance, where a measurement sensor (e.g., laser scanner 15) of the sensor set 200 was moved in the X-Y direction along a traversal path to collect measurements, the controller causes the same measurement sensor to traverse the same path and collect measurements at the same measurement locations. Step S1140-3 may be incorporated within step S340 of operation S300.

In step S1140-4, the controller 20 analyzes, based on the first height measurement readings and the second height measurement readings, whether the external feature was correctly inserted onto the 3D object. For instance, where the external feature was inserted into a recess of the 3D object, the controller 20 may analyze the height differences reflecting any gaps between the 3D object and the external feature, such as those illustrated in FIGS. 10C and 10D, to confirm that the positioning of the external feature falls within acceptable thresholds. Additionally, the controller 20 may analyze the height measurements at the expected location of the external feature, to confirm that the added height (e.g., difference between the first height measurement and the second height measurement at that location) matches the expected height of the external feature. If the controller 20 determines that the analysis of the height measurements conforms to expected values, the operation proceeds to step S1150. Otherwise, the controller 20 returns to step S1140-2 to take appropriate action to correct the insertion of the external feature (e.g., re-position the inserted external feature, if its positioning is not aligned; replace inserted external feature, if incorrect external feature is inserted). Step S1140-4 may be incorporated within step S350 of operation S300.

In step S1150, the controller 20 determines whether another print layer remains to be printed for the object. If another print layer remains to be printed, the operation proceeds to step S1160. If the current print layer is the final print layer, the operation proceeds to step S1170. Step S1150 may be incorporated within step S355 of operation S300.

In step S1160, the controller 20 increments the current print layer to the next layer, thereby advancing to the next layer. Generally, the next layer is the successive layer upwards in height. The operation then returns to step S1120. Step S960 may be incorporated within step S360 of operation S300.

In one embodiment, step S1140-4 is performed after completion of the print operation, rather than during the print operation. In one embodiment, step S1140-4 is performed by a remote computing platform instead of the controller 20, as described in further detail below.

Cloud Computing Embodiments

The invention has been described above based on the controller 20 performing various computing functions. However, it will be appreciated that some or all of the computing functions may alternatively be performed by a remote computing platform (e.g., cloud computing system).

In particular, the apparatus 1000 may include a network interface and may communicate with a remote computing platform (not shown) over a network (e.g., internal network, or the Internet). Instead of the controller 20 performing of the functions as described above, a subset of these functions may instead be performed by the remote computing platform, via communication between the apparatus 1000 and the remote computing platform. For example, some or all of the computations relating to generation and analysis of test results may be performed by the remote computing platform instead of the controller 20. In one embodiment, some of the functions are performed by the controller 20, while the remaining functions are performed by the remote computing platform. For instance, the more computationally-intensive functions may be performed by the remote computing platform. In one embodiment, the computational functions are performed by the controller 20 and the remote computing platform based on a hybrid approach.

In one embodiment, the computing operations described herein utilize software algorithms and/or machine learning to determine measurement locations and/or process measurement data.

In one embodiment, the measurements (and/or the analysis results) are provided to the manufacturer of the apparatus 1000 for a broader evaluation. Such measurement data may enable the recognition of printing techniques that are problematic and/or cause inaccuracies, and allow potential updates to the printing operations in the apparatus (e.g., via firmware and/or software updates) to resolve these issues.

It will be appreciated that such use of the remote computing platform may be applied to any of the above-described embodiments.

Sensor Data Collection Methods

It will be appreciated that various sensor data collection methods may be employed. In one embodiment, the sensor data collection may be continuous. For example, when verifying filament placement, continuous sensor scanning over the entire intended filament path may be performed. In one embodiment, the continuous sensor scanning may utilize a sine wave (or analogous pattern) to sample the edges of the deposited filament.

In one embodiment, the sensor data collection may be periodic (e.g., sampling). For example, when verifying filament placement, measurement locations may be determined. In one embodiment, measurement locations are provided at closer intervals in portions along the filament path that are likely to have errors. For example, in the case of a curved path, more frequent sensor sampling may be provided as the curve reduces in radius.

Differential Analysis

Various embodiments described herein employ the use of differential analysis to compare. It will be appreciated that the present invention encompasses, in addition to the particular embodiments described herein, the broader use of differential analysis. That is, differential analysis may be conducted on any aspect of the printing process to verify correctness of printing. In general, differential analysis according to the present invention may be conducted, for instance, (i) based on comparisons of sensor data from the same apparatus and within the same print operation, (ii) based on comparisons of sensor data from the same apparatus and between different print operations, or (iii) based on comparisons of sensor data from different apparatuses. For instance, the sensor data analysis conducted in operation S300 may include one or more of these forms of differential analysis. It will be appreciated that any of the verifications described herein with respect to one form of differential analysis may be alternatively applied towards the other forms of differential analysis.

Examples of differential analysis according to the present invention based on comparisons of sensor data from the same apparatus and within the same print operation, include operations S400, S700, S900, S1100.

Examples of differential analysis according to the present invention based on comparisons of sensor data from the same apparatus and between different print operations, include operation S500.

Examples of differential analysis according to the present invention based on comparisons of sensor data from different apparatuses include, for example, comparing sensor data indicating the operating conditions and/or health of these apparatuses and/or sensor data relating to print operations performed on these apparatuses.

It will also be appreciated that the embodiments described herein may be used independently or in combination (e.g., to conduct multiple, different verifications).

NON-EXCLUSIVE LIST OF VERIFICATIONS AND CONCLUSIONS

Various verifications and conclusions that may be achieved from the processing of sensor data according to the present invention may include, but are not limited to:

Defect detection
- e.g., if the determined height change generally corresponds to the nominal filament thickness, the operation may conclude that a filament was deposited correctly
- e.g., if there is no significant change in the determined height, the operation may conclude that no filament was deposited
- e.g., if the determined height change is significantly more than the nominal filament thickness, the operation may conclude that the filament was not ironed down properly or is completely loose from the prior layer Verification of positions of deposited filament
- e.g., confirming that measured data corresponds to an expected value
- e.g., a measurement scan in the region of the perimeter of the filament ends (e.g., the initial and final lengths of the filament) where no height change should be present between the pre-layer and post-layer height measurements, to confirm that the filament is not encroaching into an unintended area
- e.g., a measurement scan around the entire region where a filament was deposited
- e.g., if a filament crosses a perimeter, the filament length may be measured by following the edge of the filament
- e.g., confirming that the measured height change between pre-layer and post-layer height measurements drops off quickly when the measurement locations enter a region where the filament should not be deposited
- e.g., confirming via a user assessment Differential comparison with known successful print
- e.g., a comparison between different print operations may reveal much smaller deviations by eliminating repeatable physical effects such as small changes in the height of the filament when bridging gaps or crossing different density infill, which might be difficult to perfectly capture in a model
- e.g., these small deviations from a known good part may be then be utilized to construct a mathematical model for predicting the print accuracy of future-printed parts

Other Embodiments

Incorporation by reference is hereby made to U.S. Pat. Nos. 10,076,876, 9,149,988, 9,579,851, 9,694,544, 9,370, 896, 9,539,762, 9,186,846, 10,000,011, 10,464,131, 9,186, 848, 9,688,028, 9,815,268, 10,800,108, 10,814,558, 10,828, 698, 10,953,609, U.S. Patent Application Publication No. 2016/0107379, U.S. Patent Application Publication No. 2019/0009472, U.S. Patent Application Publication No. 2020/0114422, U.S. Patent Application Publication No. 2020/0361155, U.S. Patent Application Publication No. 2020/0371509, and U.S. Provisional Patent Application No. 63/138,987 in their entireties.

Although this invention has been described with respect to certain specific exemplary embodiments, many additional modifications and variations will be apparent to those skilled in the art in light of this disclosure. For instance, while reference has been made to an X-Y Cartesian coordinate system, it will be appreciated that the aspects of the invention may be applicable to other coordinate system types (e.g., radial). It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. An apparatus comprising:
at least one processor; and
at least one memory,
wherein the at least one memory stores computer-readable instructions which, when executed by the at least one processor, cause the processor to:
control a printer component to print a 3D object, based on print instructions that include a plurality of print parameters;
receive sensor data corresponding to a sensor reading obtained during the printing of the 3D object; and
confirm, based on the received sensor data, that at least one of the print parameters was satisfied in the printing of the 3D object,
wherein the confirming that at least one of the print parameters was satisfied in the printing of the 3D object includes comparing sensor data of the received sensor data, obtained prior to printing of a first print layer, with sensor data of the received sensor data, obtained after printing of the first print layer;
wherein the at least one of the print parameters includes a presence, an absence, or a position of an external feature inserted into the 3D object; and
wherein the confirming that at least one of the print parameters was satisfied in the printing of the 3D object includes comparing sensor data of the received sensor data, obtained prior to insertion of the external feature, with sensor data of the received sensor data, obtained after insertion of the external feature.

2. The apparatus of claim 1, wherein the at least one of the print parameters includes a presence, an absence, or a position of deposited print material.

3. The apparatus of claim 1, wherein the at least one of the print parameters includes an infill density.

4. The apparatus of claim 1, wherein the at least one of the print parameters includes a shell thickness.

5. The apparatus of claim 1, wherein the received sensor data is first sensor data and the 3D object being printed is a first instance of the 3D object, and wherein the confirming that at least one of the print parameters was satisfied in the printing of the 3D object includes comparing the first sensor data with second sensor data corresponding to a previous print operation of printing a second instance of the 3D object.

6. The apparatus of claim 5, wherein the comparing the first sensor data with the second sensor data includes comparing sensor data of the first sensor data, corresponding to a first print layer with respect to the first instance of the 3D object, with sensor data of the second sensor data, corresponding to the first print layer with respect to the second instance of the 3D object.

7. The apparatus of claim 1, wherein the received sensor data includes height or depth measurements obtained at locations of print material deposition, according to the print instructions.

8. A method comprising:

controlling a printer component to print a 3D object, based on print instructions that include a plurality of print parameters;

receiving sensor data corresponding to a sensor reading obtained during the printing of the 3D object; and confirming, based on the sensor data, that at least one of the print parameters was satisfied in the printing of the 3D object, wherein the confirming that at least one of the print parameters was satisfied in the printing of the 3D object includes comparing sensor data of the received sensor data, obtained prior to printing of a first print layer, with sensor data of the received sensor data, obtained after printing of the first print layer wherein the at least one of the print parameters includes a presence, an absence, or a position of an external feature inserted into the 3D object, and wherein the confirming that at least one of the print parameters was satisfied in the printing of the 3D object includes comparing sensor data of the received sensor data, obtained prior to insertion of the external feature, with sensor data of the received sensor data, obtained after insertion of the external feature.

9. The method of claim 8, wherein the at least one of the print parameters includes a presence, an absence, or a position of deposited print material.

10. The method of claim 8, wherein the at least one of the print parameters includes an infill density.

11. The method of claim 8, wherein the at least one of the print parameters includes a shell thickness.

12. The method of claim 8, wherein the received sensor data is first sensor data and the 3D object being printed is a first instance of the 3D object, and wherein the confirming that at least one of the print parameters was satisfied in the printing of the 3D object includes comparing the first sensor data with second sensor data corresponding to a previous print operation of printing a second instance of the 3D object.

13. The method of claim 12, wherein the comparing the first sensor data with the second sensor data includes comparing sensor data of the first sensor data, corresponding to a first print layer with respect to the first instance of the 3D object, with sensor data of the second sensor data, corresponding to the first print layer with respect to the second instance of the 3D object.

14. The method of claim 8, wherein the received sensor data includes height or depth measurements obtained at locations of print material deposition, according to the print instructions.

* * * * *